(12) United States Patent  (10) Patent No.: US 7,597,393 B1
Tuccinardi et al.  (45) Date of Patent: Oct. 6, 2009

(54) HEADREST/HEAD RESTRAINT HAVING AN INTEGRATED VIDEO SCREEN

(76) Inventors: Eugene M. Tuccinardi, 28296 Corte Ocaso, Temecula, CA (US) 92592; Ernesto R. Haack, 26935 Spring St., Perris, CA (US) 92570; Robert Murphy, Lake Elsinore, CA (US); Shanna Murphy, legal representative, 16450 Pinyon St., Lake Elsinore, CA (US) 92530; Frank Barrese, 30170 Corte Coehlo, Temecula, CA (US) 92591; Roel C. Espina, 106 W. Pennsylvania Ave., # 912, Redlands, CA (US) 92374; Jon A. Molo, 31122 Dog Leg Cir., Temecula, CA (US) 92591; Theo Zoetemelk, 6408 Heather Wood Dr., Riverside, CA (US) 92509

( * ) Notice: Subject to any disclaimer, the term of this patent is extended or adjusted under 35 U.S.C. 154(b) by 487 days.

(21) Appl. No.: 10/819,341

(22) Filed: Apr. 5, 2004

Related U.S. Application Data

(60) Provisional application No. 60/460,841, filed on Apr. 4, 2003.

(51) Int. Cl.
*A47C 7/42* (2006.01)
(52) U.S. Cl. .............................. 297/217.3; 297/188.04
(58) Field of Classification Search .............. 297/217.3, 297/188.4, 188.07
See application file for complete search history.

(56) References Cited

U.S. PATENT DOCUMENTS 3,004,815 A   10/1961   O'Kain et al.
3,258,511 A   6/1966   McGregor
3,615,188 A   10/1971   Buxton (Continued)

FOREIGN PATENT DOCUMENTS

DE        3637772 A1     5/1988

(Continued)

OTHER PUBLICATIONS

Office Action of Aug. 2, 2006 for U.S. Appl. No. 11/415,696.

(Continued)

*Primary Examiner*—Sarah McPartlin
(74) *Attorney, Agent, or Firm*—Knobbe, Martens, Olson & Bear, LLP

(57) ABSTRACT

A seat back video display assembly adapted to be positioned in the back of a vehicle seat having an outer skin cover. In one aspect, the assembly may comprise a receptacle member having sidewalls and a back wall so as to define an opening wherein the receptacle member is adapted to be positioned in the back of the vehicle seat. In addition, the assembly may further comprise a carrier member having sidewalls and a back wall so as to define an opening, wherein the carrier member includes at least one fastener that extends from the back wall of the carrier member and engages with the back wall of the receptacle member to secure the carrier member into the receptacle member. Moreover, the assembly may still further comprise a video display unit that is sized so as to be positioned secured within the opening in the carrier member, wherein the video display unit provides video signals.

15 Claims, 25 Drawing Sheets

U.S. PATENT DOCUMENTS

| | | | |
|---|---|---|---|
| 4,525,746 | A | 6/1985 | Mangold et al. |
| 4,584,603 | A | 4/1986 | Harrison |
| 4,635,110 | A | 1/1987 | Weinblatt |
| 4,647,980 | A | 3/1987 | Steventon et al. |
| 4,681,366 | A | 7/1987 | Lobanoff |
| 4,726,621 | A | 2/1988 | Muller |
| 4,756,528 | A | 7/1988 | Umashankar |
| 4,776,739 | A | 10/1988 | Hamman |
| 4,788,588 | A | 11/1988 | Tomita |
| 4,843,477 | A | 6/1989 | Mizutani et al. |
| 4,860,415 | A | 8/1989 | Witzke |
| 4,866,515 | A | 9/1989 | Tagawa et al. |
| RE33,423 | E | 11/1990 | Lobanoff |
| 4,983,951 | A | 1/1991 | Igarashi et al. |
| 5,168,615 | A | 12/1992 | Koa |
| 5,267,775 | A | 12/1993 | Nguyen |
| 5,292,174 | A | 3/1994 | Ohnuma |
| 5,293,244 | A | 3/1994 | Kawaguchi |
| 5,295,732 | A | 3/1994 | Boisset |
| 5,311,302 | A | 5/1994 | Berry et al. |
| 5,333,416 | A | 8/1994 | Harris et al. |
| 5,359,349 | A | 10/1994 | Jambor et al. |
| 5,507,556 | A | 4/1996 | Dixon |
| 5,529,265 | A | 6/1996 | Sakurai |
| 5,555,466 | A | 9/1996 | Scribner et al. |
| 5,640,297 | A | 6/1997 | Labaze |
| 5,713,633 | A | 2/1998 | Lu |
| D398,921 | S | 9/1998 | Rosen |
| 5,842,715 | A | 12/1998 | Jones |
| 5,946,055 | A | 8/1999 | Rosen |
| 5,953,784 | A | 9/1999 | Suzuki |
| 6,024,027 | A | 2/2000 | Esmaili |
| 6,055,478 | A * | 4/2000 | Heron ................ 701/213 |
| D434,400 | S | 11/2000 | Rosen |
| 6,199,948 | B1 | 3/2001 | Bush et al. |
| 6,216,927 | B1 | 4/2001 | Meritt |
| 6,250,967 | B1 | 6/2001 | Chu |
| D448,009 | S | 9/2001 | Lavelle |
| 6,292,236 | B1 | 9/2001 | Rosen |
| 6,305,046 | B1 | 10/2001 | Kingry |
| 6,339,455 | B1 | 1/2002 | Allan et al. |
| 6,394,551 | B1 | 5/2002 | Beukema |
| 6,406,334 | B2 | 6/2002 | Chu |
| 6,409,242 | B1 | 6/2002 | Chang |
| 6,450,571 | B1 | 9/2002 | Canni |
| 6,480,243 | B2 | 11/2002 | Yamamoto |
| 6,522,368 | B1 | 2/2003 | Tuccinardi et al. |
| 6,669,285 | B1 | 12/2003 | Park et al. |
| 6,739,654 | B1 | 5/2004 | Shen et al. |
| 6,750,599 | B2 | 6/2004 | Tajima |
| 6,755,491 | B2 | 6/2004 | McElheney |
| 6,762,929 | B2 * | 7/2004 | Sawyer ................ 361/681 |
| 6,786,547 | B1 | 9/2004 | Chu |
| 6,871,356 | B2 | 3/2005 | Chang |
| 6,883,870 | B2 | 4/2005 | Jost |
| 6,899,365 | B2 | 5/2005 | Lavelle |
| 6,986,190 | B2 | 1/2006 | Jost |
| 7,036,879 | B2 | 5/2006 | Chang |
| 7,038,581 | B2 * | 5/2006 | Kendall et al. ........... 340/506 |
| 7,040,697 | B1 | 5/2006 | Tuccinardi et al. |
| 7,044,546 | B2 * | 5/2006 | Chang .................. 297/217.3 |
| 7,188,895 | B1 | 3/2007 | Tuccinardi |
| 7,245,274 | B2 | 7/2007 | Schedivy |
| 7,407,227 | B1 | 8/2008 | Tuccinardi |
| 2001/0008266 | A1 | 7/2001 | Lambert |
| 2003/0025367 | A1 | 2/2003 | Boudinot |
| 2004/0007906 | A1 | 1/2004 | Park et al. |
| 2004/0032543 | A1 | 2/2004 | Chang |
| 2004/0160096 | A1 | 8/2004 | Boudinot |
| 2005/0099042 | A1 * | 5/2005 | Vitito .................. 297/217.3 |
| 2005/0242638 | A1 * | 11/2005 | Vitito .................. 297/217.3 |
| 2007/0001492 | A1 * | 1/2007 | Chang ................. 297/217.3 |
| 2007/0102973 | A1 * | 5/2007 | Vitito .................. 297/217.3 |

FOREIGN PATENT DOCUMENTS

| | | |
|---|---|---|
| DE | 19601582 A1 | 1/1996 |
| FR | 2764563 A1 | 12/1998 |
| JP | 01094048 A | 4/1989 |
| WO | WO 02/074577 A1 | 9/2002 |

OTHER PUBLICATIONS

Response to Office Action for Aug. 2, 2006 for U.S. Appl. No. 11/415,696.
Final Office Action of Mar. 13, 2007 for U.S. Appl. No. 11/415,696.
RCE & Response to Final Office Action of Mar. 13, 2007 for U.S. Appl. No. 11/415,696.
Office Action of Aug. 31, 2007 for U.S. Appl. No. 11/415,696.
Response to Office Action of Aug. 31, 2007 for U.S. Appl. No. 11/415,696.
Office Action of Jan. 31, 2007 for U.S. Appl. No. 11/415,918.
Response to Office Action of Jan. 31, 2007 for U.S. Appl. No. 11/415,918.
Final Office Action of Jul. 30, 2007 for U.S. Appl. No. 11/415,918.
RCE and Response to Final Office Action of Jul. 30, 2007 for U.S. Appl. No. 11/415,918.
Restriction Requirement of Jul. 19, 2004 for U.S. Appl. No. 10/395,870.
Response to Restriction Requirement of Jul. 19, 2004 for U.S. Appl. No. 10/395,870.
Office Action of Sep. 27, 2004 for U.S. Appl. No. 10/395,870.
Response to Office Action of Sep. 27, 2004 for U.S. Appl. No. 10/395,870.
Final Office Action of May 3, 2005 for U.S. Appl. No. 10/395,870.
RCE & Response to Final Office Action of May 3, 2005 for U.S. Appl. No. 10/395,870.
Notice of Allowance of Dec. 6, 2005 for U.S. Appl. No. 10/395,870.

* cited by examiner

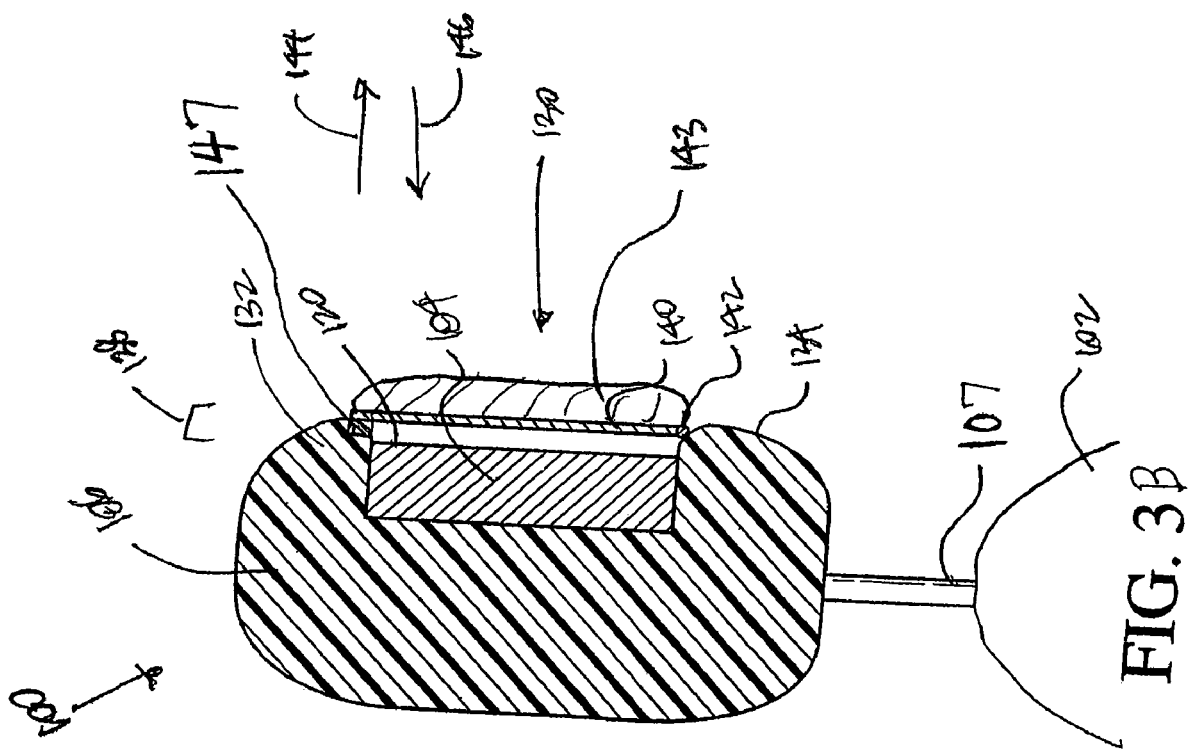

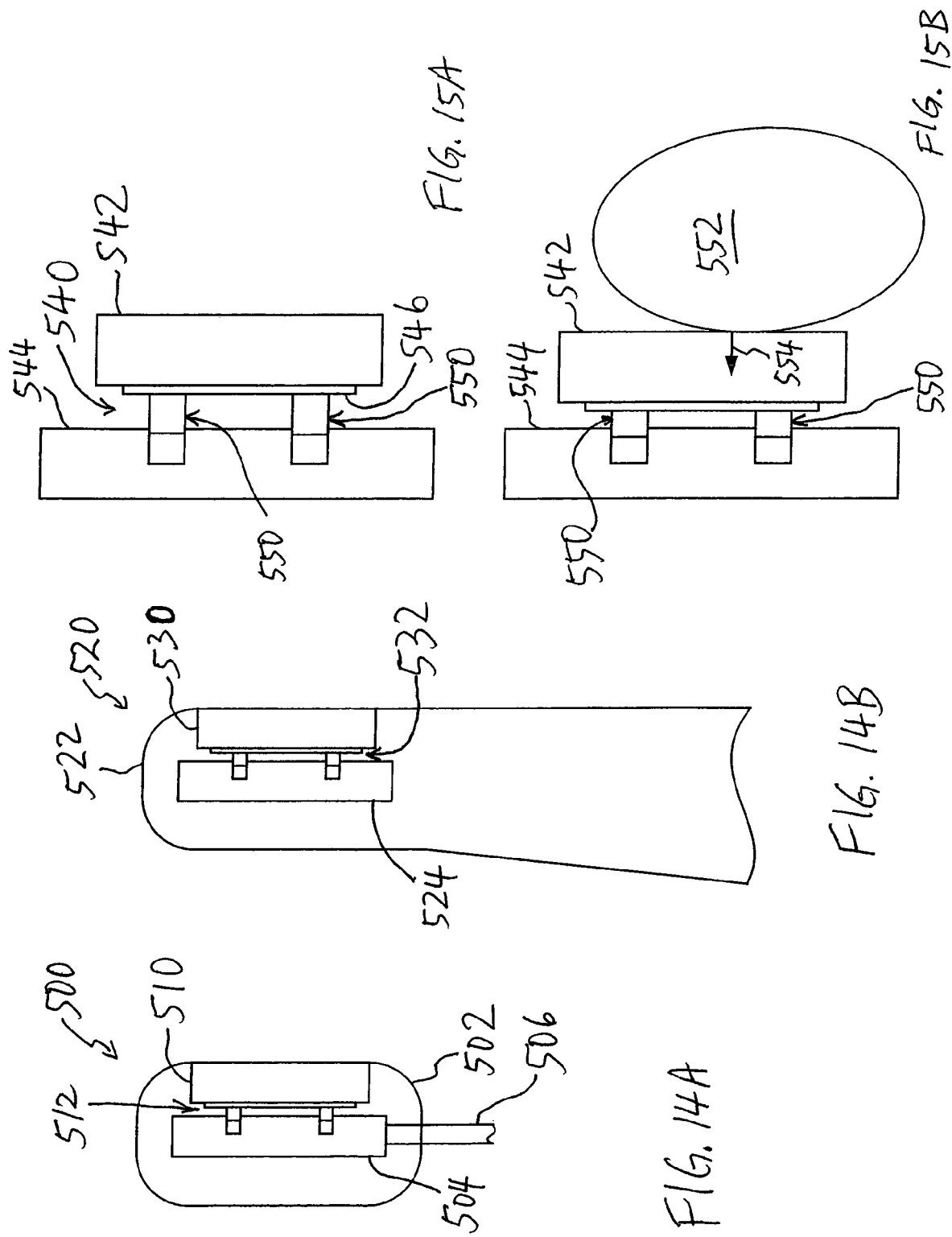

HEADREST/HEAD RESTRAINT HAVING AN INTEGRATED VIDEO SCREEN

CLAIM OF PRIORITY

This U.S. patent application is related to U.S. Pat. No. 7,040,697, filed Mar. 20, 2003, entitled, "Headrest Having An Integrated Video Screen" and co-pending patent application Ser. Nos. 11/415,696, filed May 2, 2006, entitled, "Headrest Having An Integrated Video Screen" and 11/415,918, filed May 2, 2006, entitled, "Headrest Having An Integrated Video Screen", which are hereby incorporated by reference herein in their entirety. This U.S. patent application also claims priority to U.S. Provisional Patent Application No. 60/460, 841, entitled "Integrated Video System for Vehicle Seats" filed Apr. 4, 2003, which is hereby incorporated by reference herein in its entirety.

BACKGROUND OF THE INVENTION

1. Field of the Invention

The present invention relates to vehicles and, in particular, to a head restraint for vehicle seats having an integrated video screen mounted therein.

2. Description of the Related Art

Seat back video monitors are becoming increasingly popular in vehicles. Originally, these entertainment systems were largely confined to airplanes, however, recently, these systems have become much more popular with cars, trucks and SUVs. These entertainment systems provide the opportunity for passengers to view entertainment or educational video programs during long trips.

Typically, these systems have been installed as aftermarket products where the seat back or head restraint, whether part of an adjustable head restraint unit or a molded bucket seat, is modified to accept the video display device, however, more of these systems are being installed as original equipment. Unfortunately, existing systems are often difficult and labor intensive to mount, particularly as an aftermarket product and are also subject to being dislodged.

Generally, the devices are mounted on the outer surface of the seat back where they protrude. In many vehicles, the space between seats is limited, hence the protruding video display unit can inhibit the ability of passengers to easily get into and out of the vehicles. Moreover, passenger contact with the protruding video display screen may result in the screens being inadvertently dislodged, or result in occupant injury in a collision.

A further difficulty with many existing video display unit designs is that they are not well secured to the seat. This is particularly the case for designs that allow the video display unit to pivot about an axis to improve the viewing angle of the passenger. One common way that these display units are installed is that a bucket is installed into the seat and the peripheral rim of the bucket includes openings that receive pivot posts that extend outward from the housing of the display unit. The pivot posts are positioned within the openings and keepers or caps are then positioned in the openings to prevent the pivot posts from being removed from the openings.

In these designs, the keepers or caps are generally press fit and are exposed to the passenger. Hence, inadvertent contact may result in the keepers or caps being dislodged. Moreover, many of the passengers are children who, through boredom, may attempt to remove the keepers which can result in the video display being dislodged and potentially damaged.

Thus, one can see that improvements can be made on ways a video display screens or associated devices are mounted to various types of seats. Some of the areas where improvments can be made include safety issues associated with an occupant impacting the video display assembly, cosmetic integration of the video display assembly, and efficiency of packaging the video display assembly.

Hence, from the foregoing, there is a need for a seat back video display system and method of mounting that provides more secure mounting of the video display unit. To this end, there is a need for an assembly that is less likely to be dislodged through inadvertent contact and does not have exposed detachable mounting components.

SUMMARY OF THE INVENTION

The foregoing needs are addressed by the present teachings relating to a head restraint having an entertainment system. One aspect of the present teachings relates to a media assembly adapted to be installed into a seat back of a vehicle. The assembly includes a mounting structure that is coupled to the seat back of the vehicle. The seat back defines a first outer surface visible to a viewer sitting in a back seat of the vehicle. The assembly further includes a display that displays media to a viewer sitting within the vehicle. The assembly further includes a media player having an input opening into which a user can position a media storage device. The media player provides signals to the display to thereby induce the display to visually display the contents of the media storage device. The assembly further includes a housing defining a recess having a first opening that receives both the display and the media player such that the display is positioned proximate the first opening of the recess with the media player positioned inward in the recess from the first opening such that the media player does not impede visual access to the display. The housing is structured to permit selective access to the input opening of the media player to permit user positioning of the media storage device within the player. The housing is adapted to be coupled to the mounting structure within the seat back of the vehicle to thereby retain the housing within the seat back such that the display is positioned adjacent the outer surface of the seat back.

In one embodiment, the housing defines a second opening and the media player is positioned within the recess such that the input opening of the media player is accessible through the second opening of the housing. In one opening, the housing is mounted to the mounting structure such that the second opening is accessible through a second outer surface of the seat. In one embodiment, the second outer surface of the seat comprises a side surface of the seat. In one embodiment, the second outer surface of the seat comprises a top surface of the seat.

In one embodiment, the housing is pivotally mounted with respect to the mounting structure such that the display screen can be adjusted for improved visibility to the viewer. In one embodiment, the housing comprises a ball and the mounting structure comprises a socket such that the ball is positioned within the socket to permit adjustment of the housing with respect to the mounting structure in two separate directions.

In one embodiment, the housing is pivotally attached to the mounting structure so as to be rotatable between a recessed position. The display is positioned substantially flush with the first outer surface of the seat and the input opening of the media player is hidden from view within the seat and a extended position. The input opening of the media player is exposed from the seat so as to be accessible to the viewer. In one embodiment, the mounting structure comprises a retainer that defines a recess having two opposed side walls positioned within the seat. The housing is pivotally attached to the retainer at the two opposed side walls to facilitate movement between the recessed position and the extended position. In one embodiment, the retainer defines two opposed side walls and an opposed upper and lower wall. The housing is pivotally attached to the to the two opposed side walls adjacent the lower wall of the retainer such that the input opening of the media player is positioned proximate the upper wall of the retainer when the housing is in the recessed position.

In one embodiment, at least one energy dissipation element is interposed between the seat and the assembly such that in the event of a collision, contact between the viewer and the media assembly results in at least a portion of the energy resulting from the collision being dissipated by the at least one energy dissipation element. In one embodiment, the at least one energy dissipation element comprises a deformable dissipation element that dissipates the energy by inelastically deforming. In one embodiment, the at least one deformable dissipation element comprises a member that is structured to have a bending point along the member such that forces on the member during a collision result in the bending of the member and dissipation of force. In one embodiment, the member comprises a first and a second leg with the bending point interposed therebetween such that forces on the member during a collision result in the first member being deformed into a position more proximate the second member. In one embodiment, the energy dissipation element is interposed between the mounting structure and the seat.

Another aspect of the present teachings relates to an electronic assembly mounted to a head restraint of a vehicle seat. The assembly includes a media player that retrieves information stored on a media storage device, processes the information, and outputs a signal corresponding to the information. The assembly further comprises a panel display device that receives the signal from the media player and displays a visual representation of the signal. The assembly further comprises a housing assembly that houses the media player and the panel display device as a substantially single unit. The housing assembly facilitates mounting of the substantially single unit to the head restraint.

Yet another aspect of the present teachings relates to a method of mounting an entertainment system to a head restraint of a vehicle. The method includes housing a media player and a panel display as a substantially single unit such that a signal output by the media player is received by the panel display and displayed as a visual representation. The method further includes mounting the housed substantially single unit to the head restraint.

Yet another aspect of the present teachings relates to a head restraint for a vehicle, where the head restraint includes a support member that provides structural integrity of the head restraint. The head restraint further includes an electronic entertainment component disposed at least partially within the rear portion of the head restraint. The head restraint further includes a coupling member that mechanically couples the electronic entertainment component to the support member. The coupling member dissipates at least a portion of energy associated with an impact of an object on the electronic entertainment component.

These and other features and advantages of the present teachings will become more fully apparent from the following description taken in conjunction with the accompanying drawings.

BRIEF DESCRIPTION OF THE DRAWINGS

FIGS. 3A, 3B illustrate a cross-sectional view of the adjustable head restraint shown in FIG. 1A having the integrated video screen mounted therein with a screen cover.

FIGS. 14A and B illustrate cutaway views of energy dissipating head restraint assemblies for adjustable and fixed vehicle seats having a media component.

FIGS. 15A and B illustrate a dissipation of energy due to an impact force on the media component.

DETAILED DESCRIPTION OF THE PREFERRED EMBODIMENT

Reference will now be made to the drawings wherein like numerals refer to like parts throughout. A head restraint for vehicle seats having an integrated video screen mounted therein in a flush or recessed manner will be described in greater detail herein below with reference to the drawings. In one aspect, it should be appreciated that the term vehicle seats refers to a plurality of generally known vehicle seats, such as those manufactured for automobiles, buses, boats, cars, semi-trucks, etc., wherein the following discussion can be similarly applied to these various types of vehicle seats without departing from scope of the present teachings. In addition, the following discussion refers to mounting the integrated video screen to the head restraint of vehicle seats but may also be applied to other various component features of vehicle seats, such as the seat back, without departing from the scope of the present teachings.

Figure 1A:
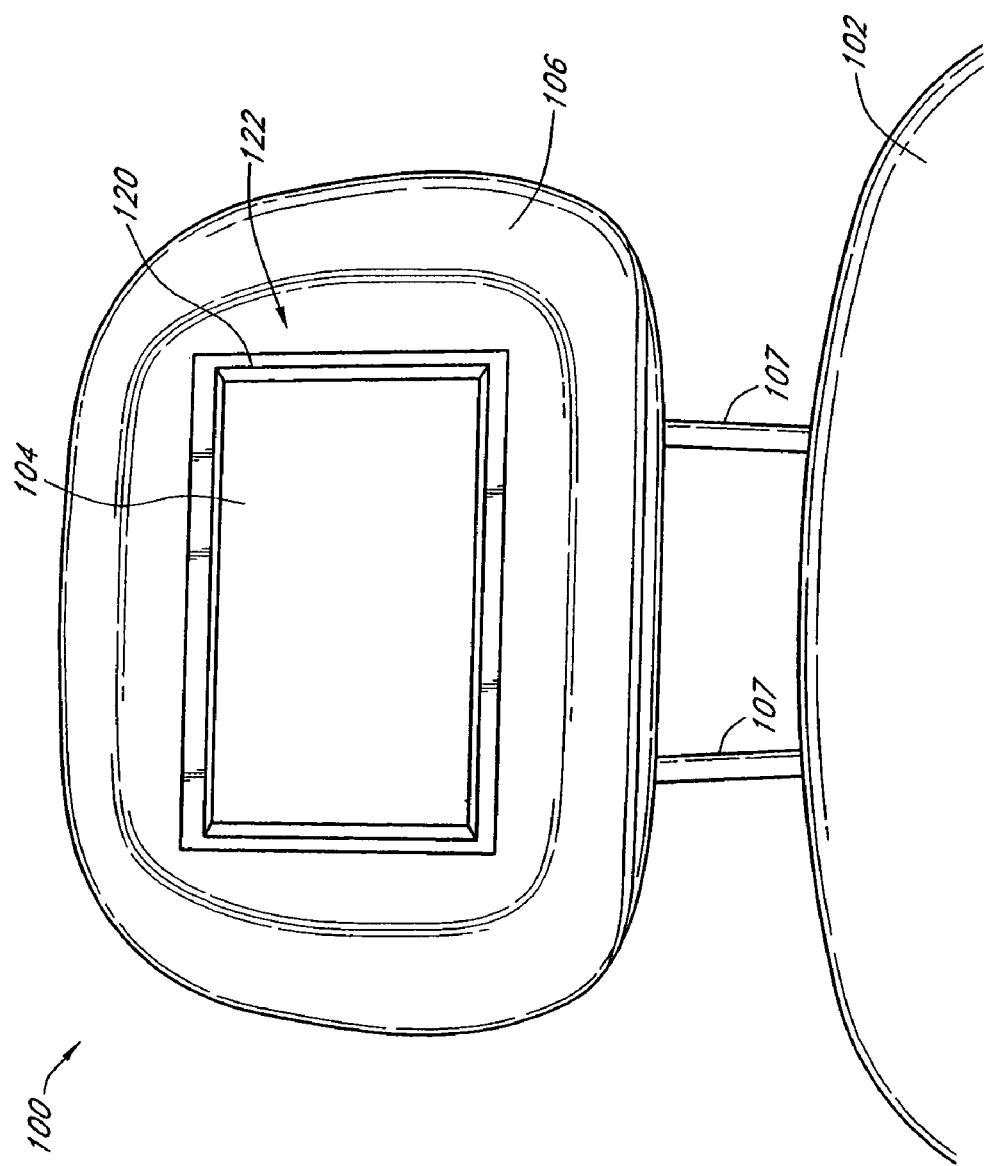
FIG. 1A illustrates an adjustable head restraint for a vehicle seat having an integrated video screen mounted therein.
Figure 1B:
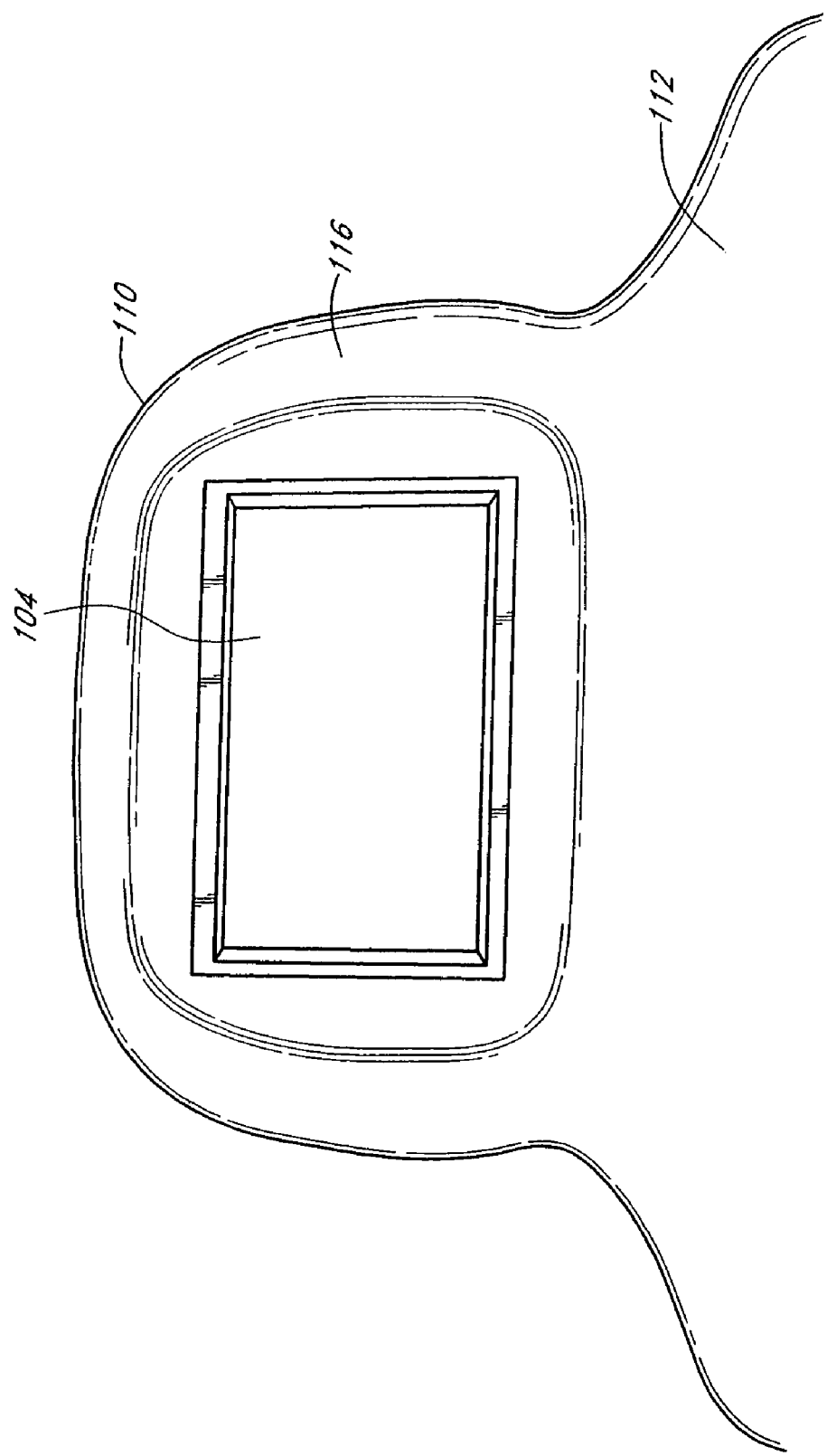
FIG. 1B illustrates a fixed head restraint for a vehicle seat having the integrated video screen of FIG. 1A mounted therein.

FIG. 1A illustrates an adjustable head restraint 100 for a first vehicle seat 102 having an integrated video screen 104 mounted therein. As illustrated in FIG. 1A, the adjustable head restraint 100 is coupled to the seat 102 via posts 107 that extend therefrom and allow vertical adjustment of the adjustable head restraint 100 with respect to the seat 102 in a generally known manner. FIG. 1B illustrates a fixed head restraint 110 for a second vehicle seat 112 having the integrated video screen 104 mounted therein. In one embodiment, the video screen 104 is mounted within a head restraint bun 106, 116 (FIG. 1A) that is adapted to receive the video screen 104 for firm attachment therein in a manner that will be described in greater detail herein below. In addition, as will be described in greater detail herein below, the video screen 104 is mounted such that a front surface 120 of the video screen 104 is either flush or recessed from a contour 122 (FIG. 1A) of the head restraint 100 (FIG. 1A), 110.

As shown in FIGS. 1A and B, the video screen 104 comprises a panel type display. In one embodiment, the video screen 104 comprises a generally known LCD (liquid crystal display). Other panel type devices, such as flat panel or flexible panel display devices can also be used as the video screen 104. Such a monitor or terminal that can be electrically coupled to a video entertainment system so as to receive video signals therefrom for viewing of movies, television, internet web pages, video games, etc. As illustrated, the video screen 104 is generally rectangular in shape with the planar front surface 120 that is viewable by a user. In one aspect, it should be appreciated that the degree of recessed depth (with no depth comprising a flush mount) of the integrated video screen 104 and the manner in which the contour 122 of the seat 102, 112 is shaped may be selected such that the shape (side view, for example) of the head restraint 100, 110 with the integrated video screen 104 mounted therein is generally similar to the shape of the head restraint 100, 110 without the integrated video screen 104. Moreover, it should be appreciated that the vehicle seats 102, 112 may comprise any one of a number of various types or models of generally known vehicle seats without departing from the scope of the present invention.

Figure 2:
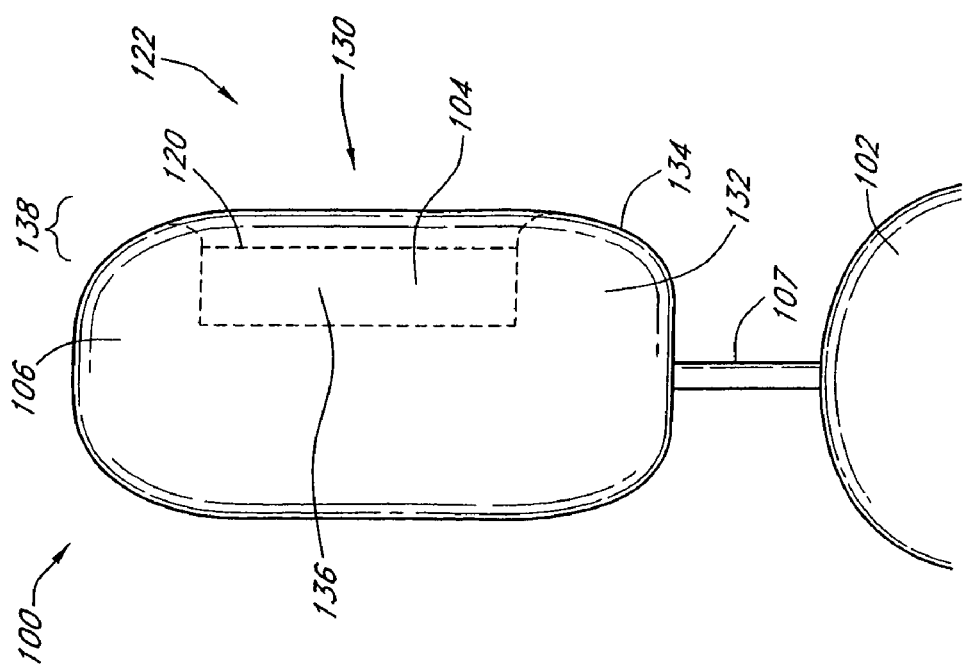
FIG. 2 illustrates a side view of the adjustable head restraint shown in FIG. 1A having the integrated video screen mounted therein with a recessed orientation.

FIG. 2 illustrates a side view of the adjustable head restraint 100 shown in FIG. 1A having the integrated video screen 104 mounted therein with a recessed orientation. It should be appreciated that the following discussion is with respect to the adjustable head restraint 100 of FIG. 1A but may be similarly applied to the fixed head restraint 110 of FIG. 1B without departing from the scope of the present teachings.

FIG. 2 further illustrates the side view shape or contour 122 of the head restraint 100. As illustrated in FIG. 2, the contour 122 of the head restraint 100 is maintained due to the recessed orientation of the video screen 104 within the head restraint bun 106. In addition, an opening 130 is formed in a rear section 132 of the head restraint 100 so as to define a substantially rectangular interior region 136 within the head restraint bun 106 below an outer surface 134 of the head restraint 100. As further illustrated in FIG. 2, the video screen 104 can then be positioned adjacent the opening 130 so as to be firmly positioned within the interior region 136 of the head restraint bun 106. Moreover, the recessed orientation may be defined by a depth 138 between the front surface 120 of the video screen 104 and the outer surface 134 of the head restraint 100. The depth 138 therebetween may vary in magnitude depending on the thickness of the head restraint bun 106 and/or the internal structural characteristics of the head restraint 100, which may vary with respect to the type or model of vehicle seat used. In one embodiment, the depth 138 of the recessed orientation may comprise a magnitude of approximately zero so as to define a flush mounted video screen 104, wherein the front surface 120 of the video screen 104 is generally aligned with the outer surface 134 of the head restraint 100.

In one embodiment, orientation of the video screen 104 can be adjusted to provide an generally optimal viewing angle for an occupant. Such an orientation of the video screen 104 in some embodiments of the head restraint 100 may result in the front surface 120 being not generally parallel to the outer surface 134 of the head restraint 100. In such an embodiment, the video screen 104 is mounted in the head restraint 100 so as to generally maintain the cosmetic integrity of the original design while providing a generally optimal viewing angle.

Figure 3A:
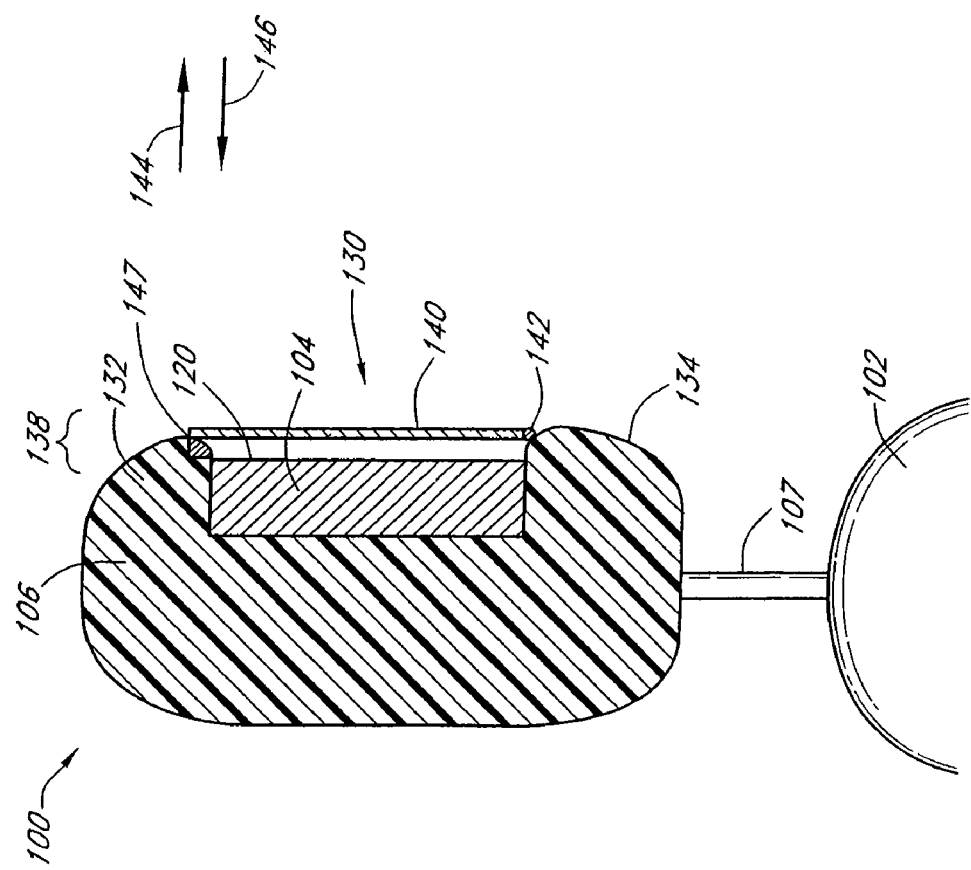

FIG. 3A illustrates a cross-sectional view of the adjustable head restraint 102 shown in FIG. 1A having the integrated video screen 104 mounted therein with the recessed orientation shown in FIG. 2 and a screen cover 140. In one embodiment, the screen cover 140 is coupled to the rear section 132 of the head restraint 100 via a hinge 142 so as to overlie the video screen 104 and at least part of the opening 130 formed therein. The screen cover 140 may comprise generally rectangular shape and is oriented generally parallel to the front surface 120 of the video screen 104 so as to temporarily occlude the video screen 104. In one aspect, as further illustrated in FIG. 3A, the screen cover 140 can be positioned adjacent the opening 130 so as to substantially align with the outer surface 134 of the head restraint 100 thus forming a flush mounting therewith. It should be appreciated that the screen cover 140 may be positioned within the opening 130 so as to be recessed with respect to the outer surface 134 of the head restraint 100 without departing from the scope of the present teachings. Moreover, the screen cover 140 may comprise a rigid material, such as plastic, metal, etc. Alternatively, in another aspect, the screen cover 140 may comprise a piece or flap of material from an outer skin 230 (FIG. 8) of the vehicle seat 102 that is attached to the head restraint 100 adjacent the lower side of the video screen 104.

In still another aspect, as illustrated in FIG. 3B, the screen cover 140 may comprise an impact attenuating section 143 comprising a material such as foam, various types of padding, an air cushion, etc. so as to soften the force of an impact from an object. For example, during a car accident, a person's head may be propelled towards the screen cover 140, wherein the impact attenuating material may soften the impact to the head restraint 102 to thereby protect the person's head and the video screen 104 from damage.

Also, in one embodiment, the video screen 104 can be viewed by opening the screen cover 140 or temporarily occluded by closing the screen cover 140. Hence, the screen cover 140 can be outwardly rotated about the hinge 142 in a first direction 144 to openly view the video screen 104, or the screen cover 140 can be inwardly rotated about the hinge 142 in a second direction 146 opposite the first direction 144 to temporarily occlude the video screen 104. Advantageously, the screen cover 104, when closed, conceals the video screen 104 from view thus, in some situations, functions as a thief deterrent.

Moreover, in one aspect, the recessed configuration of the video screen 104 facilitates the manner in which the screen cover 140 may be deployed. For example, the video screen 104 may not physically interfere with the closing of the screen cover 140. In addition, as illustrated in FIGS. 3A, 3B, the screen cover 140 is intended to "hide" the video screen 104 from outside observers, thereby reducing the probability that the video screen 104 will be a target of theft. As further illustrated in FIGS. 3A, 3B, the screen cover 140 may further comprise a means for engagement 147 that allows the screen cover 140 to remain in the "up" or closed configuration. In general, it should be appreciated that some possible means for achieving such an engagement include but are mot limited to magnetic strips, mechanical clips, velcro strips, and the like.

Figure 4:
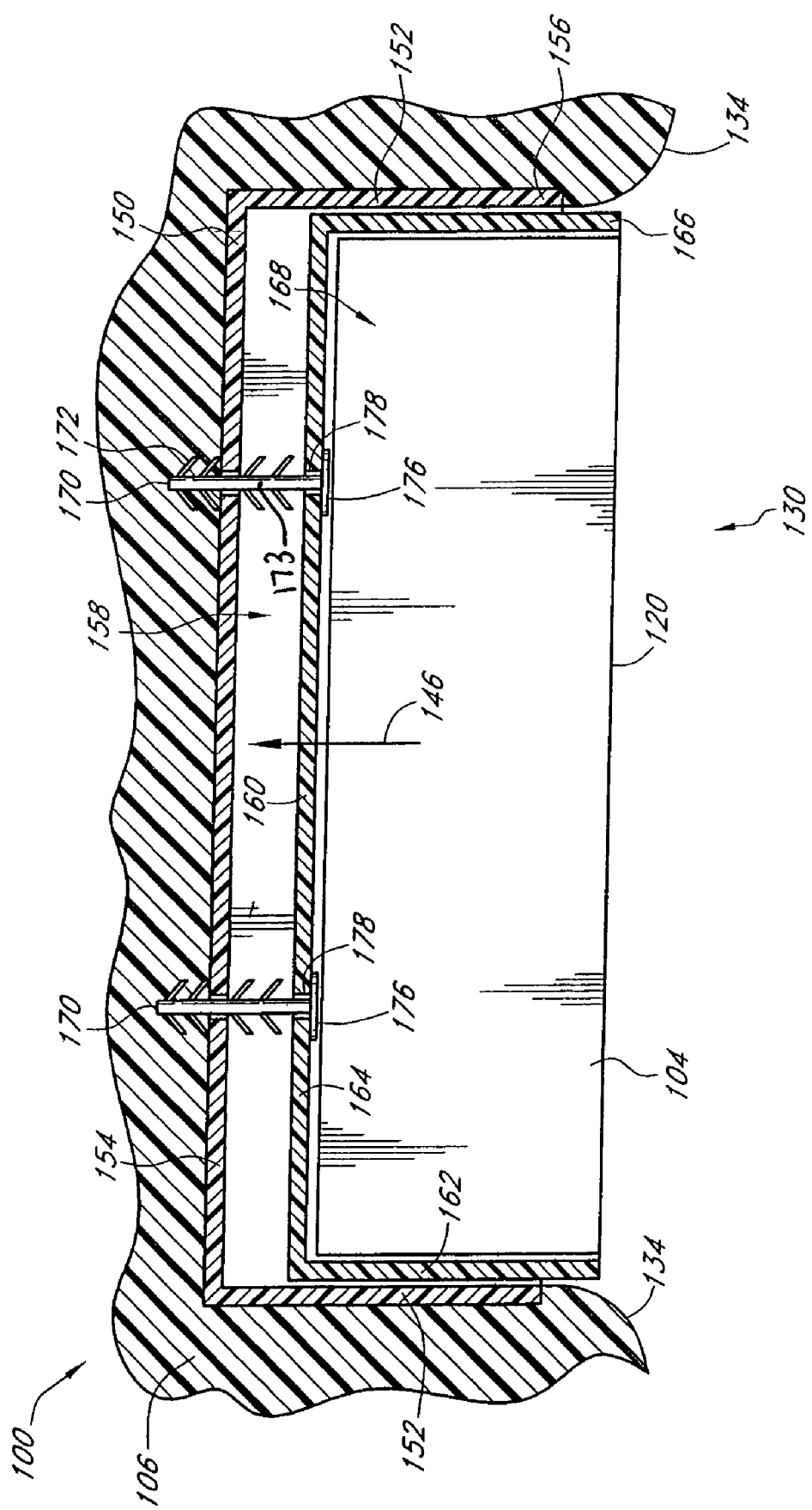
FIG. 4 illustrates a cross-sectional view of the integrated video screen being mounted to the head restraint via a carrier receptacle, a carrier member, and a plurality of fasteners.
Figure 5:
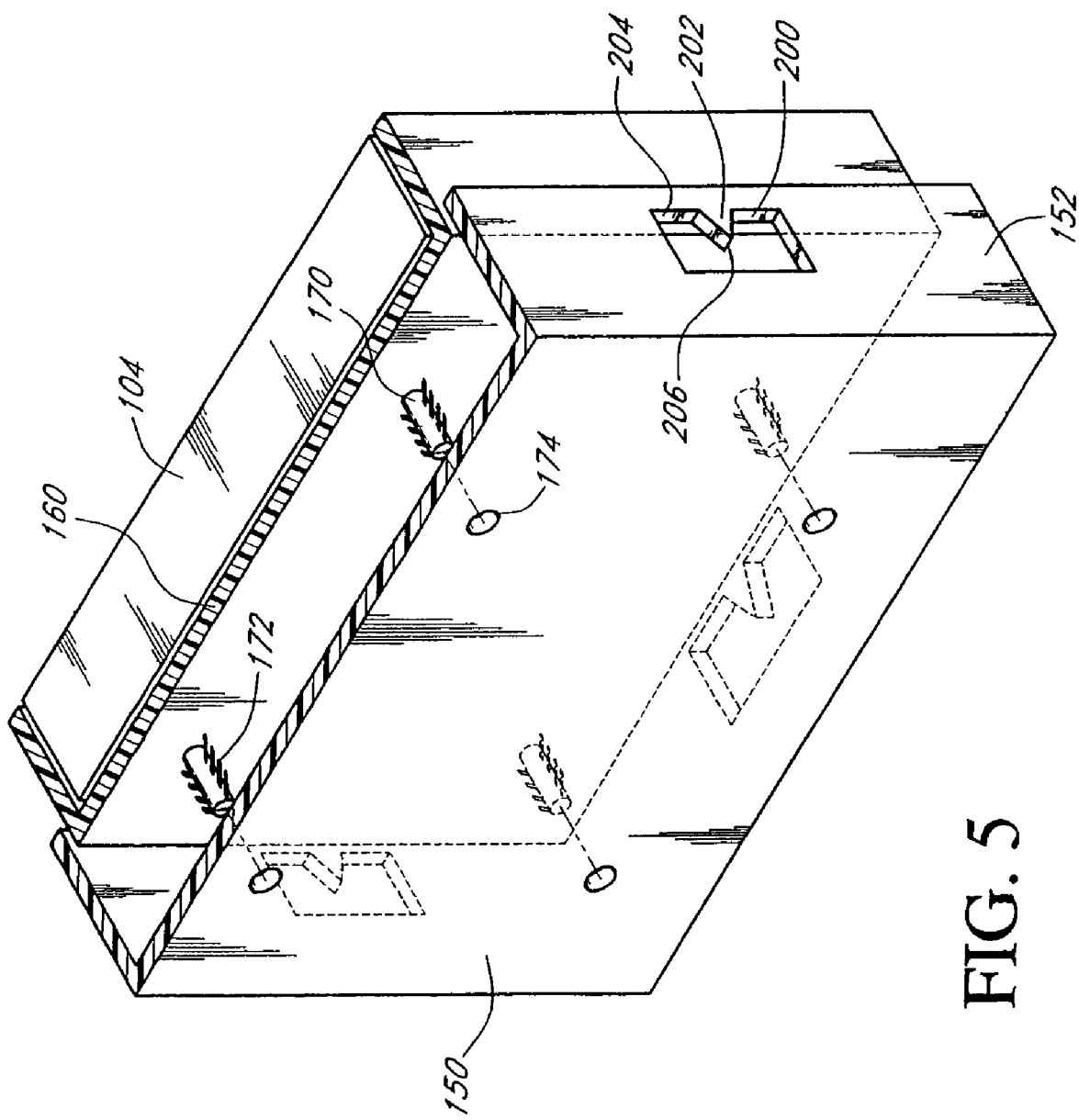
FIG. 5 illustrates an perspective view of the integrated video screen being mounted to the head restraint via the carrier member and the plurality of fasteners of FIG. 4.

FIG. 4 illustrates a cross-sectional view of the integrated video screen 104 being mounted to the head restraint 100 via a carrier receptacle 150, a carrier member 160, and first fasteners 170. FIG. 5 illustrates a perspective view of the integrated video screen 104 being mounted to the head restraint 100 via the carrier receptacle 150, the carrier member 152, and the first fasteners 170. In one embodiment, the carrier receptacle 150 comprises a plurality of planar sidewalls 152 and a rear planar wall 154 that are joined together in a manner so as to form a substantially rectangular outer structure 156 having an inner recessed region 158 that is adapted to receive the carrier member 160 therein. Similarly, the carrier member 160 comprises a plurality of planar sidewalls 162 and a rear planar wall 164 that are joined together in a manner so as to form a substantially rectangular outer structure 166 having an inner recessed region 168 that is adapted to receive the video screen 104 therein.

As illustrated in FIG. 4, the video screen 104 may be mounted within the carrier member 160 via side fasteners 180 (shown in FIGS. 6A, 6B) and then the carrier member 160 is mounted within the carrier receptacle 150 via the first fasteners 170 so as to simplify the mounting of the video screen 104 to the head restraint 100 including the head restraint bun 106. In one aspect, the first fasteners 170 may comprise a plurality of flexible engagement members 172 that extend therefrom so as to mechanically couple with a plurality of mounting apertures 174 (FIG. 5) formed in the rear wall 154 of the carrier receptacle 150. The first fasteners 170 may further comprise a central member 173 that extends outward from the rear wall 164 of the carrier member 160. Also, the flexible engagement members 172 are attached to the central member 173, wherein the flexible engagement members 172 are deformable so as to allow insertion of the central member 173 into the mounting apertures 174 in the rear wall 164 of the receptacle member 150. Moreover as shown in FIG. 4, the flexible engagement members 172 are biased outward so as to inhibit removal of the central member 173 from the mounting apertures 174 in the rear wall 154 of the receptacle member 150. In addition, the first fasteners 170 comprise a head 176 that abuts the rear wall 164 of the carrier member 152 and is positioned through a plurality of second apertures 178 formed in the rear wall 164 of the carrier member 160.

Advantageously, as shown in FIGS. 4 and 5, the video screen 104 can be mounted to the head restraint 100 via the carrier receptacle 150 and the carrier member 160 without using external fasteners that may be seen. Hence, the video screen 104 can be mounted to the head restraint 100 in a more aesthetically appealing manner, wherein the front surface 120 of the video screen 104 recessed or flush mounted with respect to the outer surface 134 of the head restraint 100, and wherein the first and second fasteners 170, 180 are concealed from view.

As illustrated in FIG. 5, the sidewalls 152 of the carrier receptacle 150 each comprise at least one sidewall aperture 200 having at least one serrated tooth 202 protruding from an interior sidewall 204. In one embodiment, the at least one serrated tooth 202 is triangular in shape having a pointed tip 206 that projects outward from the interior sidewall 204 in a horizontal manner. It should be appreciated that the serrated tooth 202 may comprise any one of a number of various shapes known in the art without departing from the scope of the present teachings. Additionally, as will be also shown in FIG. 8, the pointed tip 206 engages with the outer skin 230 (FIG. 8) and inhibits removal of the outer skin 230 from the at least one sidewall aperture 200 formed in the carrier receptacle 150. Advantageously, as will be described in greater detail herein below, the serrated tooth 202 allows outer skin from the buns 106, 116 (FIGS. 1A and B) to be attached to the carrier receptacle 150 by wrapping the outer skin around the planar sidewalls 152 and into the recessed region 158 of the carrier receptacle 150 and then securing the outer skin to the serrated tooth 202.

Figure 6A:
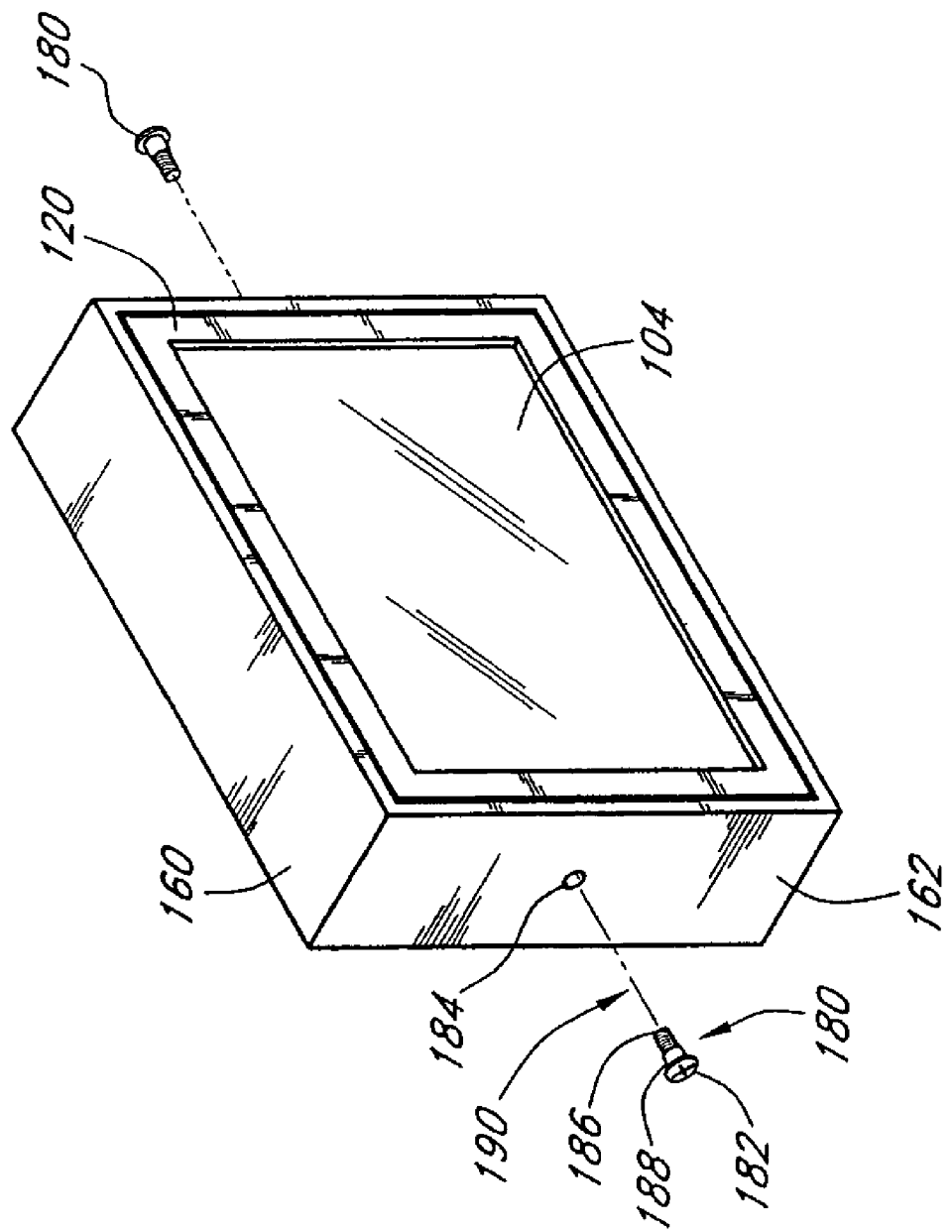
FIGS. 6A, 6B illustrate a perspective view of mounting the integrated video screen to the carrier member.

FIG. 6A illustrates a perspective view of attaching the integrated video screen 104 to the carrier member 160 via the second fasteners 180. In one embodiment, the planar sidewalls 162 of the carrier member 160 comprise pivot apertures 184 that allow the video display 104 to be mounted to the carrier member 160. Also, the pivot apertures 184 are adapted to rotatably receive the second fasteners 180. As illustrated in FIG. 6A, one embodiment of the second fasteners 180 comprise a threaded region 186 that mechanically couples to threaded apertures 196 (FIG. 7) formed in the video screen 104 in a generally known manner so as to be securely attached thereto. Moreover, the second fasteners 180 further comprise a head 182 and a smooth pivot region 188 interposed between the threaded region and the head 182.

In one aspect, the pivot region 188 of the second fastener 180 rotatably communicates with the pivot aperture 184 of the carrier member 160 to thereby allow the video screen 104 to pivot or tilt with respect to the carrier member 160 and/or the head restraint 100, 110 along a horizontal pivot axis 190 defined by the horizontally mounted second fasteners 180. Hence, the video screen 104 is pivotally attached to the carrier member 160 such that the plane of the video screen 104 can be adjusted with respect to the head restraint 100, 110 by a user about the defined horizontal pivot axis 190. Advantageously, the horizontal pivot axis 190 allows the video screen 104 to readily pivot when mounted to the head restraint 100, 110 to thereby allow greater positional flexibility during viewing of the video screen 104 by a user.

Figure 6B:
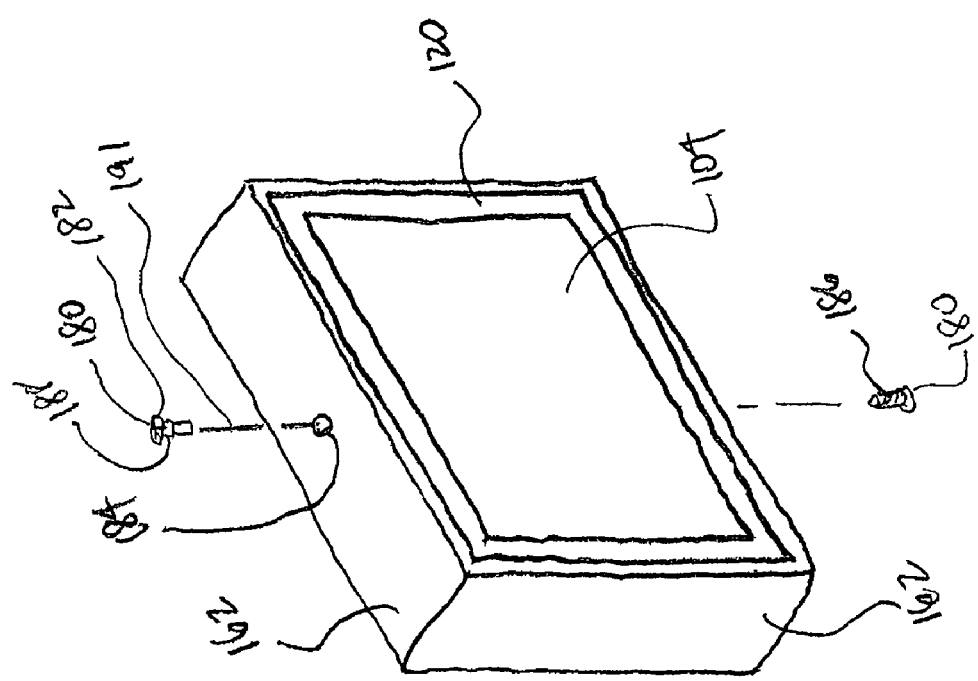

FIG. 6B further illustrates a perspective view of attaching the integrated video screen 104 to the carrier member 162 via the second fasteners 180. In one embodiment, as illustrated in FIG. 6B, the second fasteners 180 can be mounted vertically through the planar sidewalls 162 of the carrier member 160. The pivot region 188 of the vertically mounted second fasteners 180 rotatably communicates with the pivot aperture 184 of the carrier member 160 to thereby allow the video screen 104 to pivot or tilt side-to-side with respect to the carrier member 160 and/or the head restraint 100, 110 along a vertical pivot axis 191 defined by the vertically mounted second fasteners 180. Hence, the video screen 104 is pivotally attached to the carrier member 160 such that the plane of the video screen 104 can be adjusted with respect to the head restraint 100, 110 by a user about the vertical pivot axis 191. Advantageously, the vertical pivot axis 191 allows the video screen 104 to readily pivot when mounted to the head restraint 100, 110 to thereby allow greater positional flexibility during viewing of the video screen 104 by a user.

In one aspect, it should be appreciated that the second fasteners 180 may comprise generally known screws, such as sheet metal screws, without departing from the scope of the present invention. It should also be appreciated that the pivot region 188 of the second fasteners 180 may be threaded in a manner such that the video screen 104 can still pivot with respect to the carrier member 150 without departing from the scope of the present invention.

Figure 6C:
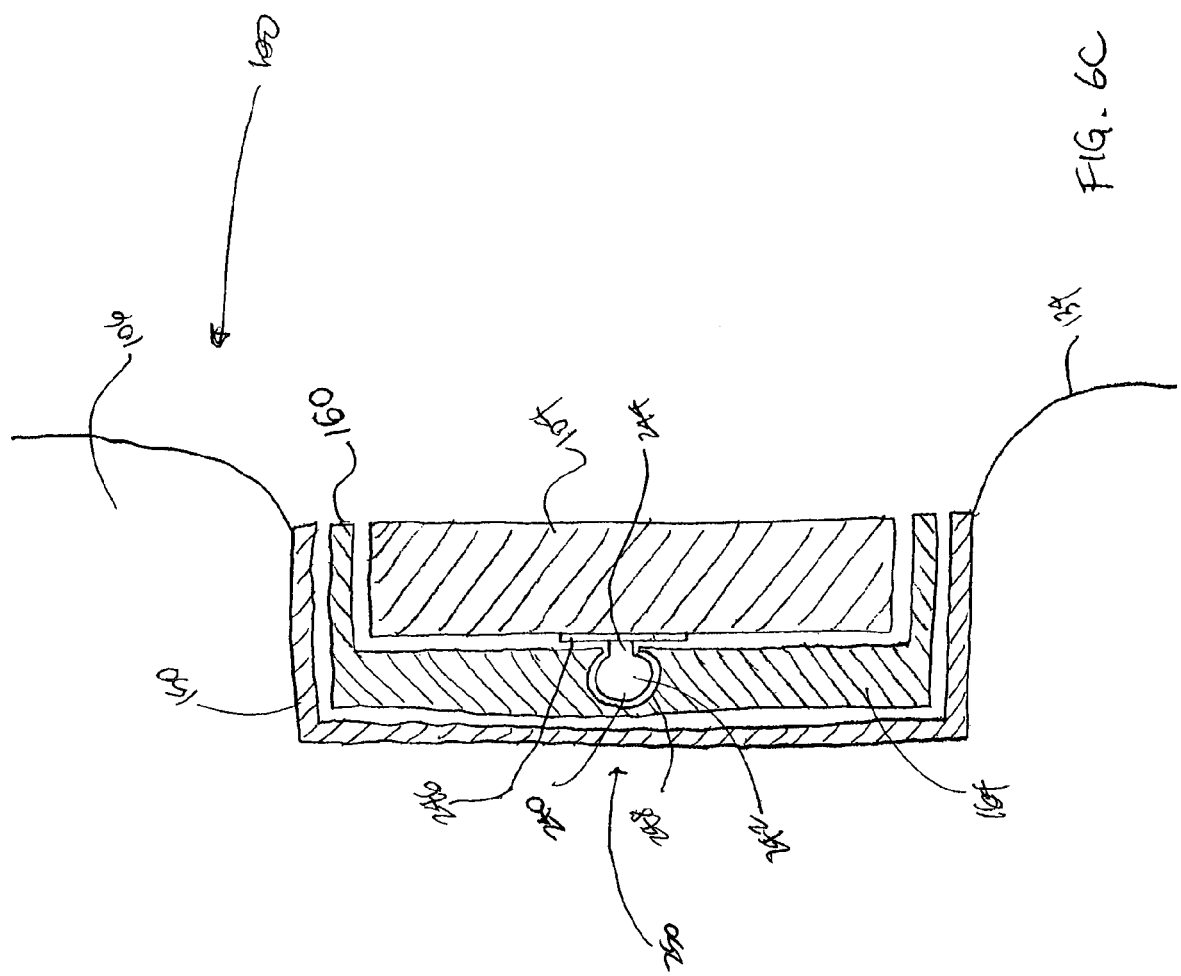
FIG. 6C illustrates a side view of mounting the integrated video screen to the carrier member via pivot member.

FIG. 6C illustrates a view of attaching the integrated video screen 104 to the carrier member 160 via a pivot member 240. In one embodiment, as illustrated in FIG. 6C, the pivot member 240 comprises a spherical ball 242 attached to the video screen 104 via a shaft 244 and a plate 246. The spherical ball 242 is positioned within a spherical receptacle 248 formed in the rear wall 164 of the carrier member 160. As illustrated in FIG. 6C, the rear wall 164 of the carrier member 160 may be dimensioned so as to accommodate the spherical receptacle 248. In one aspect, the plate 246 of the pivot member 240 may be attached to the video screen 104 using an adhesive, such as epoxy or glue, or fasteners, such as screws or bolts. In addition, the shaft 244 distally extends from the plate 246 towards the spherical receptacle 248 of the carrier member 160. Also, the shaft 244 and the spherical ball 242 may be formed as an integral part of the plate 246 or may be formed separately and interconnected to the plate 246 via an adhesive or fasteners.

Moreover, once the pivot member 240 is attached to the video screen 104 in a manner as previously described, the spherical ball 242 of the pivot member 240 can be pressed to fit within the spherical receptacle 248 formed in the rear wall 164 of the carrier member 160. In one aspect, the spherical ball 242 may be sized at least less than the size of the spherical receptacle 248 so as to allow rotational movement therein. Advantageously, the resulting interconnection between the spherical ball 242 of the pivot member 240 and the spherical receptacle 248 of the carrier member 160 defines a pivot point 250 to thereby allow the Video screen 104 to pivot, tilt, or rotate in a multi-directional manner with respect to the defined pivot point 250. Therefore, the defined pivot point 250 allows the video screen 104 to readily pivot when mounted to the head restraint 100, 110 to thereby allow greater positional flexibility during viewing of the video screen 104 by a user.

Figure 7:
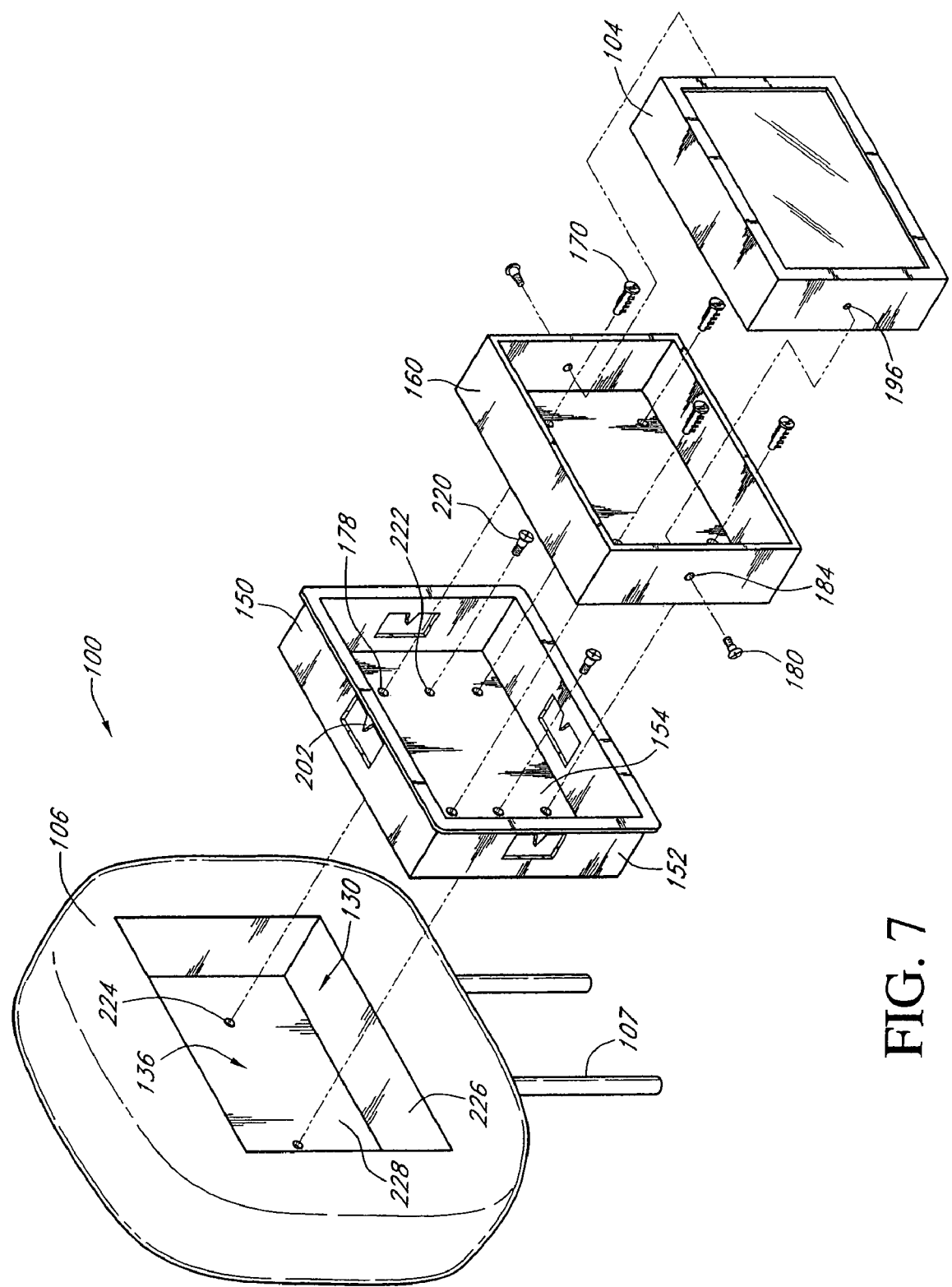
FIG. 7 illustrates a perspective view of mounting the integrated video screen to the adjustable head restraint of FIG. 1A.

FIG. 7 illustrates a perspective view of mounting the integrated video screen 104 to the head restraint 100, 110 of FIGS. 1A and B. In one embodiment, as illustrated in FIG. 7, the opening 130 is formed in the head restraint bun 106 so as to define the substantially rectangular interior region 136 and to receive the carrier receptacle 150. The carrier receptacle 150 can then be positioned within the opening 130 so that the planar sidewalls 152 and the planar rear wall 154 abut the interior walls 226 of the mounting recess 136 formed in the head restraint bun 106. In one embodiment, the carrier receptacle 150 can be secured to the head restraint 100, 110 via one or more third fasteners 220, such as screws, machine screws, sheet metal screws, clips, etc. As illustrated in FIG. 7, the third fasteners 220 are positioned through rear wall apertures 222 formed in the rear wall 154 of the carrier receptacle 150 and coupled to rear mounting apertures 224 formed in a back wall 228 of the mounting recess 136 of the head restraint bun 106. Advantageously, the third fasteners 220 can be securely attached to a structural component (not shown) of the head restraint 100, 110, such as an internal framework member of the head restraint 100, 110, so as to form a rigid attachment between the carrier receptacle 150 and the head restraint 100, 110.

In addition, the video screen 104 may be mounted to the carrier member 160 so as to pivot with respect thereto in a manner as previously described with reference to FIGS. 6A, 6B, 6C. Following, the carrier member 160 including the video screen 104 can then be mounted to the carrier receptacle 150 via the first fasteners 170 in a manner as previously described with reference to FIG. 4. Advantageously, this method of attaching the video screen 104 to the head restraint 100, 110 via the carrier receptacle 150, the carrier member 160, and the fasteners 170, 180 allows the video screen 104 to be securely mounted to the head restraint 100, 110 while providing a means for pivoting the video screen 104 with respect to the head restraint 100, 110 so as to improve the viewing range by a user. It will be appreciated that the mounting assembly describe above in reference to FIG. 7 may also be used in the head restraint 110 of the bucket type seat of FIG. 1B.

Figure 8:
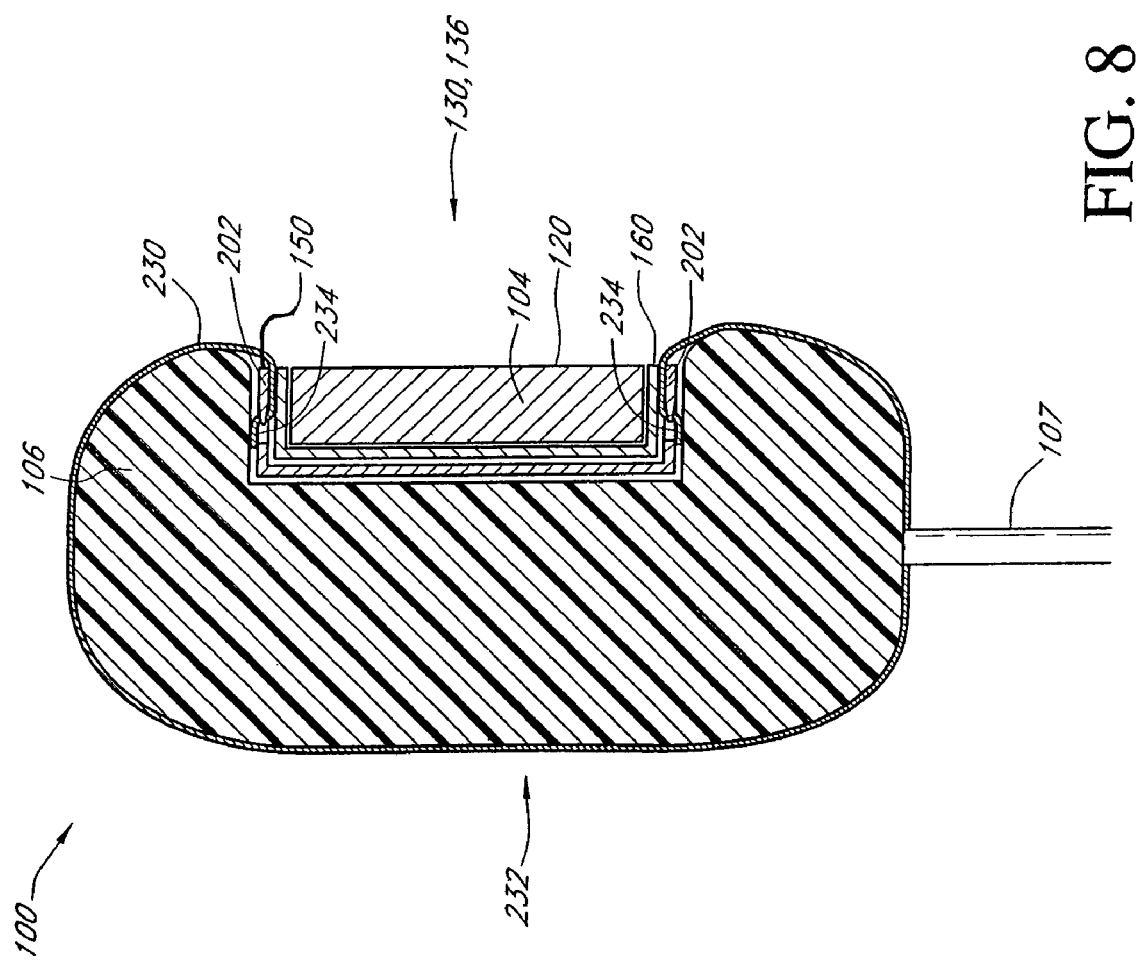
FIG. 8 illustrates a cross-sectional view of the video screen mounted to the head restraint, wherein an outer skin from the head restraint is secured to the carrier receptacle.

FIG. 8 illustrates a cross-sectional view of the video screen 104 mounted to the head restraint 100, wherein the outer skin 230 of the head restraint 100 of the vehicle seat 102 is attached to the carrier receptacle 150 and the carrier member 160 with the video screen 104 mounted therein is mounted within the mounting recess 136 of the carrier receptacle 150. As is generally known, many vehicle seats comprise the illustrated outer skin 230, such as fabric, leather, upholstery, vinyl, etc., that provides a outer surface 232 for a user to lean against or rest upon. In one aspect, when mounting the integrated video screen 104 into the head restraint 100, 112 of the vehicle seat 102, 112, the outer skin 230 is adapted to accommodate the video screen 104 including the carrier receptacle 150. In some situations, one or more flaps 234 can be formed in the outer skin 230 and attached to the one or more serrated teeth 202 formed in the planar sidewalls 152 of the carrier receptacle 150.

As further illustrated in FIG. 8, the carrier receptacle 150 may be positioned within the mounting recess 136 formed in the head restraint bun 106, and then the outer skin 230 is secured to the serrated teeth 202 via the flaps 234 formed therein by hooking the flaps 234 to one or more of the serrated teeth 202. Once the outer skin 230 is attached to the serrated teeth 202 via the flaps 234, the carrier member 160 is firmly pressed within the mounting recess 136 of the head restraint bun 106 so that the first fasteners 170 couple to the mounting apertures 174 formed in the rear wall 154 of the carrier receptacle 150.

Advantageously, this interconnection between the carrier member 160 and carrier receptacle 150 provides a quick and easy means for mounting of the video screen 104 to the head restraint 100, 110. In addition, the pressed fit of the outer skin between the carrier member 160 and the carrier receptacle 150 further secures the outer skin of the vehicle seat 102, 112 to the carrier receptacle 150. As a result, the outer skin is securely held to the carrier receptacle 150 via the one or more serrated teeth 202 formed in the planar sidewalls 152 of the carrier receptacle 150 and the pressed fit of the carrier member 160 within the mounting recess 136 of the carrier receptacle 150.

Figure 9A:
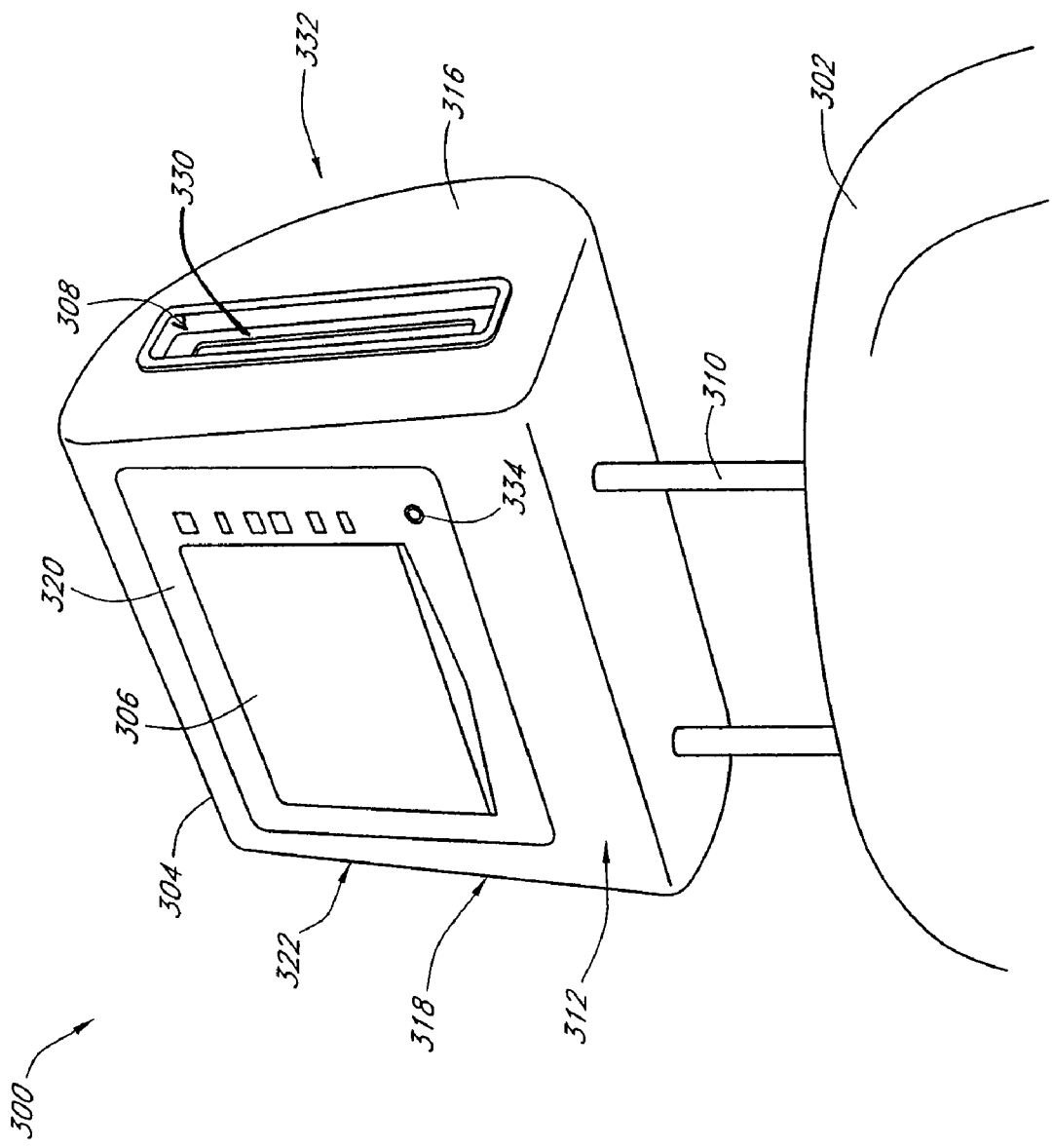
FIG. 9A illustrates one embodiment of a video system for a vehicle seat having a head restraint with an integrated video monitor and a side-loading media player.

FIG. 9A illustrates one embodiment of a video system 300 for a vehicle seat or seat back 302 having a head restraint 304 with an integrated video display or monitor 306 and a side-loading media player 308 mounted therein. In one embodiment, as illustrated in FIG. 9A, the head restraint 304 is coupled to the vehicle seat or seat back 302 via posts 310 that extend therefrom and allow vertical adjustment of the head restraint 304 with respect to the vehicle seat 302 in a generally known manner. In one aspect, the video monitor 306 is mounted within a rear section 312 of the head restraint 304 of the vehicle seat 302 that is adapted to receive the video monitor 306 for secure attachment therein.

In addition, the video monitor 306 is generally rectangular in shape with a planar front surface 320 that is viewable by a user. Also, the video monitor 306 is mounted such that the front planar surface 320 thereof is either flush or recessed from a rear contour 322 of the head restraint 304. In one embodiment, the video monitor 306 comprises a panel display device. Such a panel device may comprise, by way of example, a flat panel display, a flexible panel display, or a liquid crystal display (LCD). Such a monitor or terminal that can be electrically coupled to a video entertainment system including the illustrated media player 308 so as to receive video signals therefrom for viewing of movies, television, internet web pages, video games, etc.

In one embodiment, the media player 308 is mounted within a first side section 316 of the head restraint 304 that is adapted to receive the media player 308 for secure attachment therein. In addition, the media player 308 is generally rectangular in shape with a planar front surface 330 that is accessible by a user from the first side section 316 of the head restraint 304. Also, the media player 308 is mounted such that the front planar surface 330 thereof is either flush or recessed from a first side contour 332 of the head restraint 304. It should be appreciated that the media player 308 may also be mounted on a second side section 318 of the head restraint 304 in a similar manner without departing from the scope of the present teachings. In addition, it should also be appreciated that a recess (shown in FIG. 9C as 328) may be formed in the side section 316 of the head restraint 304 and may be adapted to receive the media player 308 for secure attachment therein without departing from the scope of the present teachings.

Additionally, in one aspect, the media player 308 may comprise a generally known digital video disc (DVD), hard disc storage, memory chip, and the like player that can be electrically coupled to a video entertainment system including the illustrated video monitor 306 so as to provide video signals thereto for displaying of movies, television, internet web pages, video games, etc. In addition, the media player 308 is mounted within the head restraint 304 so as to not interfere with the operation of the panel display 306. Moreover, in another aspect, the media player 308 is electrically coupled to the panel display 306 such that, during operation, a user can insert a media storage device, such as a DVD (not shown), into the media player 308 in a generally known manner so as to view images stored on the media storage device via the panel display 306. Furthermore, in still another aspect, the panel display 306 may further comprise an audio interface 334, such as a headphone jack, that is electrically coupled to the media player 308 so as to provide audio signals thereto for listening to movies, television, music, video games, etc. In one embodiment, the panel display 306 may include one or more interfaces, such as audio/visual jacks, for viewing signals from one or more auxiliary media devices.

In another aspect, the video system 300 may comprise a wireless component that can be used to receive wireless communication signals for communication with a backbone network (not shown). For example, the backbone network may include various wireless information exchange networks, such as an Ethernet, Intranet, and/or Internet server or communications interface. In general, the video system 300 may establish a communication link with the backbone network, which may comprise various types of external wireless communication links via satellite or antenna, hardwired communication links within the vehicle for internal communications, or some combination thereof to facilitate the exchange of information between the video system 300 and the backbone network.

Advantageously, a user may interact with the backbone network via the video system 300 to stream video, exchange images, download audio files, text messaging, online financial transactions, remote teleconferencing, etc. In addition, the media player 308 may be adapted to comprise digital memory components, such as hard drives, flash memory, magnetic memory, various types of non-volatile memory components, etc., for storing audio, video, and data files and information for viewing, exchanging, and processing thereof at the convenience of the user for purposes of personal entertainment, business operations, etc.

Moreover, the media player 308 including the panel display 306 may comprise various types of input ports, such as USB, serial, parallel, firewire, RCA, etc., to facilitate peripheral interconnection, such as connection to PDAs, laptop computers, printers, various types of storage media, audio/video devices, speaker systems, etc., for the purpose of interaction therewith. Therefore, the video system 300 including the panel display 306 and the media player 308 can be advantageously adapted to integrate various technologies that are associated with most computer based systems.

Furthermore, it should be appreciated that the degree of recessed depth (with no depth comprising a flush mount) of the panel display 306 and the integrated media player 308 may be selected such that the shape (front or side view, for example) of the head restraint 304 with the panel display 306 and media player 308 mounted therein is generally similar to the shape of the head restraint 304 without the panel display and player positioned therein. In addition, it should also be appreciated that the vehicle seats 302 may comprise any one of a number of various types or models of generally known vehicle seats without departing from the scope of the present teachings.

Figure 9B:
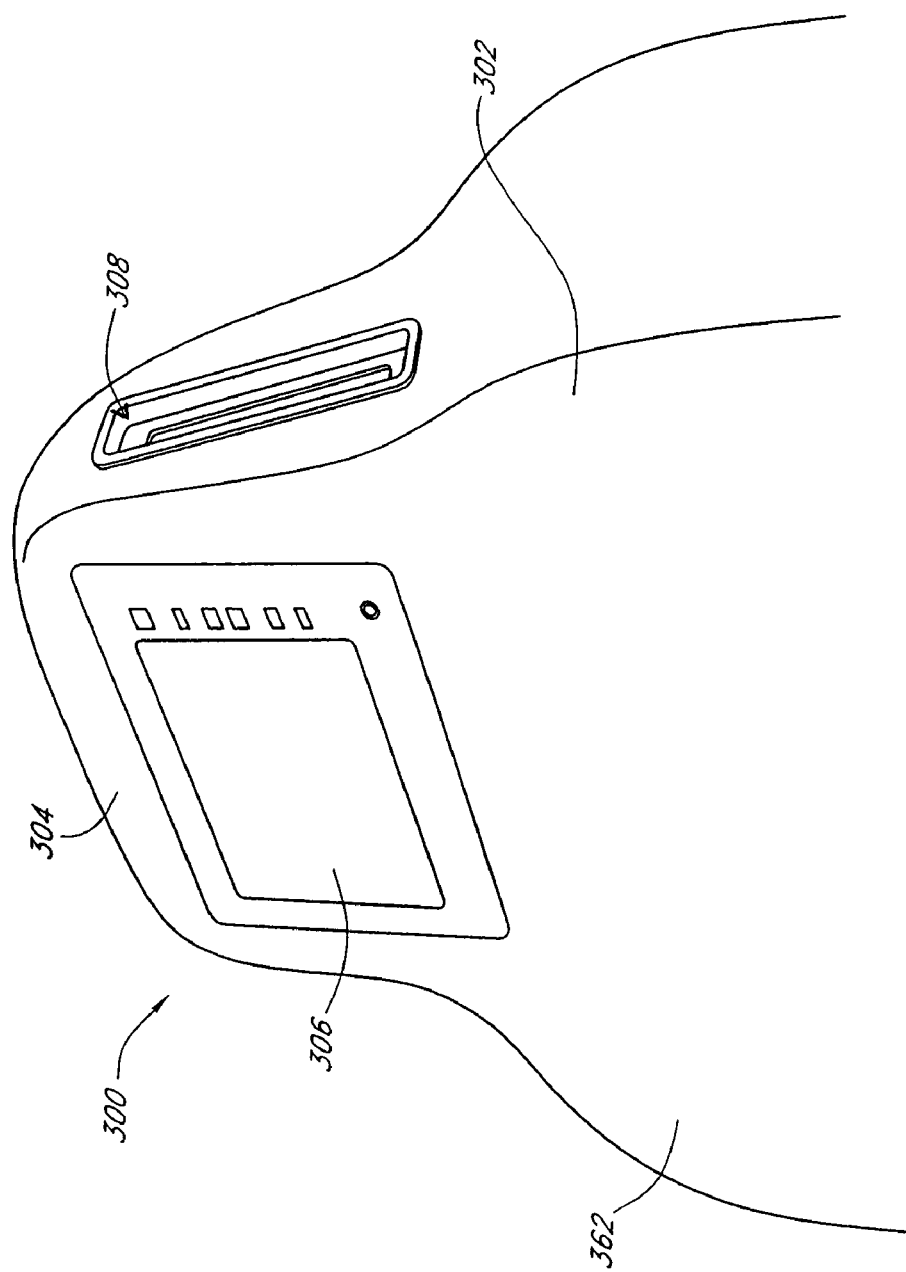
FIG. 9B illustrates another embodiment of the video system for a vehicle seat.

FIG. 9B illustrates another embodiment of the video system 300 for a vehicle seat 362 having the head restraint 304 formed as part of the vehicle seat or seat back 302. It should be appreciated that the video system 300 including the video display and player may be integrated into the illustrated vehicle seat 362.

Figure 9C:
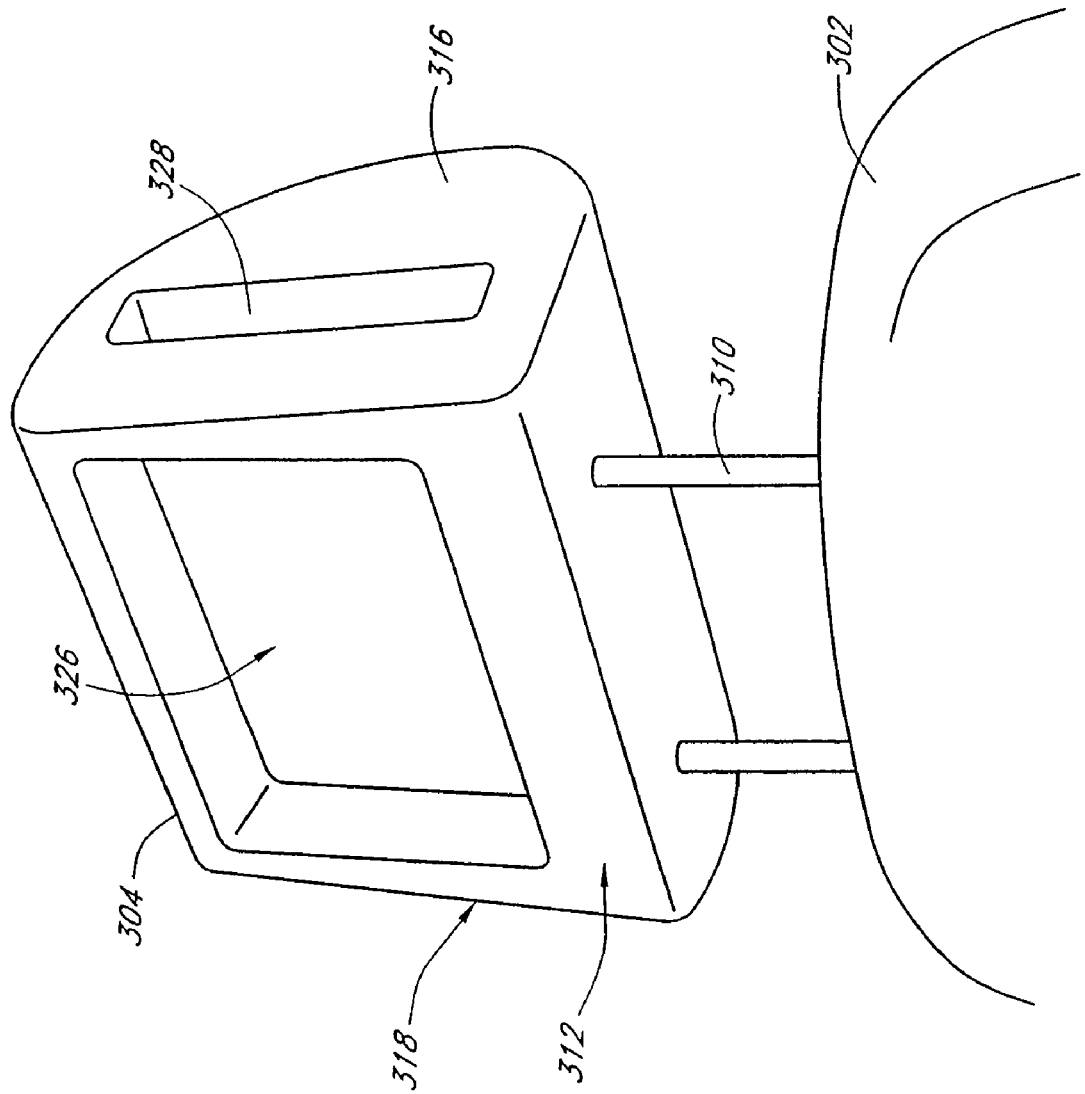
FIG. 9C illustrates a plurality of recesses formed in the head restraint.

FIG. 9C illustrates first and second recesses 326, 328 formed in the head restraint 304. In one embodiment, the recesses 326, 328 are formed in the head restraint 304 so as to receive the panel display 306 and media player 308, respectively, for secure attachment thereto. As illustrated in FIG. 9C, the first recess 326 may be formed in the rear section 312 of the head restraint 304 and may be adapted to receive the panel display 306 for secure attachment therein. Also, as further illustrated in FIG. 9C, the second recess 328 may be formed in the first side section 316 or second side section 318 of the head restraint 304 and may be adapted to receive the media player 308 for secure attachment therein. It should be appreciated by those skilled in the art that the recesses 326, 328 may be formed in the vehicle seat 362 of FIG. 9B without departing from the scope of the present teachings.

Figure 10:
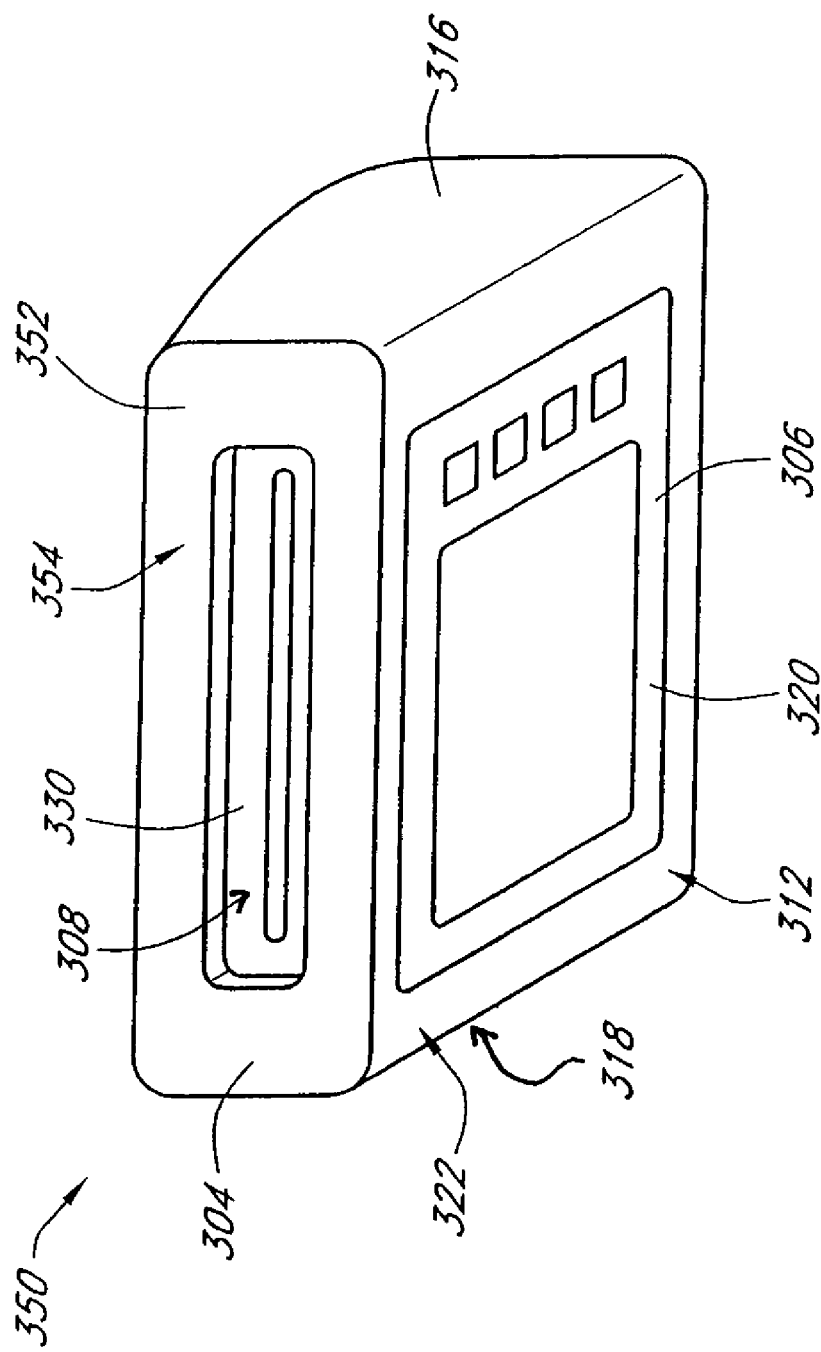
FIG. 10 illustrates another embodiment of a video system for the vehicle seat having the head restraint with the integrated video monitor and a top-loading media player.

FIG. 10 illustrates another embodiment of a video system 350 for the vehicle seat 302 having the head restraint 304 with the panel display 306 and a top-loading media player 308 mounted thereto. As illustrated in FIG. 2, the panel display 306 is mounted within the head restraint 304 in a manner as previously described. Alternatively, the media player 308 is mounted within an upper section 352 of the head restraint 304 that is adapted to receive the media player 308 for secure attachment therein. In addition, the planar front surface 330 of the media player 308 is accessible by a user from the upper section 352 of the head restraint 304. Also, the media player 308 is mounted such that the front planar surface 320 thereof is either flush or recessed from an upper contour 354 of the head restraint 304. Moreover, the media player 308 is mounted within the upper section 352 of the head restraint 304 so as to not interfere with the operation of the panel display 306.

It should be appreciated by those skilled in the art that the panel display 306 and media player 308 function in a similar manner as previously described with reference to FIG. 9A. In addition, it should also be appreciated that a recess (not shown) may be formed in the upper section 352 of the head restraint 304 and may be adapted to receive the media player 308 for secure attachment therein without departing from the scope of the present teachings. Moreover, it should also be appreciated by those skilled in the art that the top-loading media player 308 as illustrated in FIG. 10 may be formed in the vehicle seat 362 of FIG. 9B without departing from the scope of the present teachings.

Figure 11A:
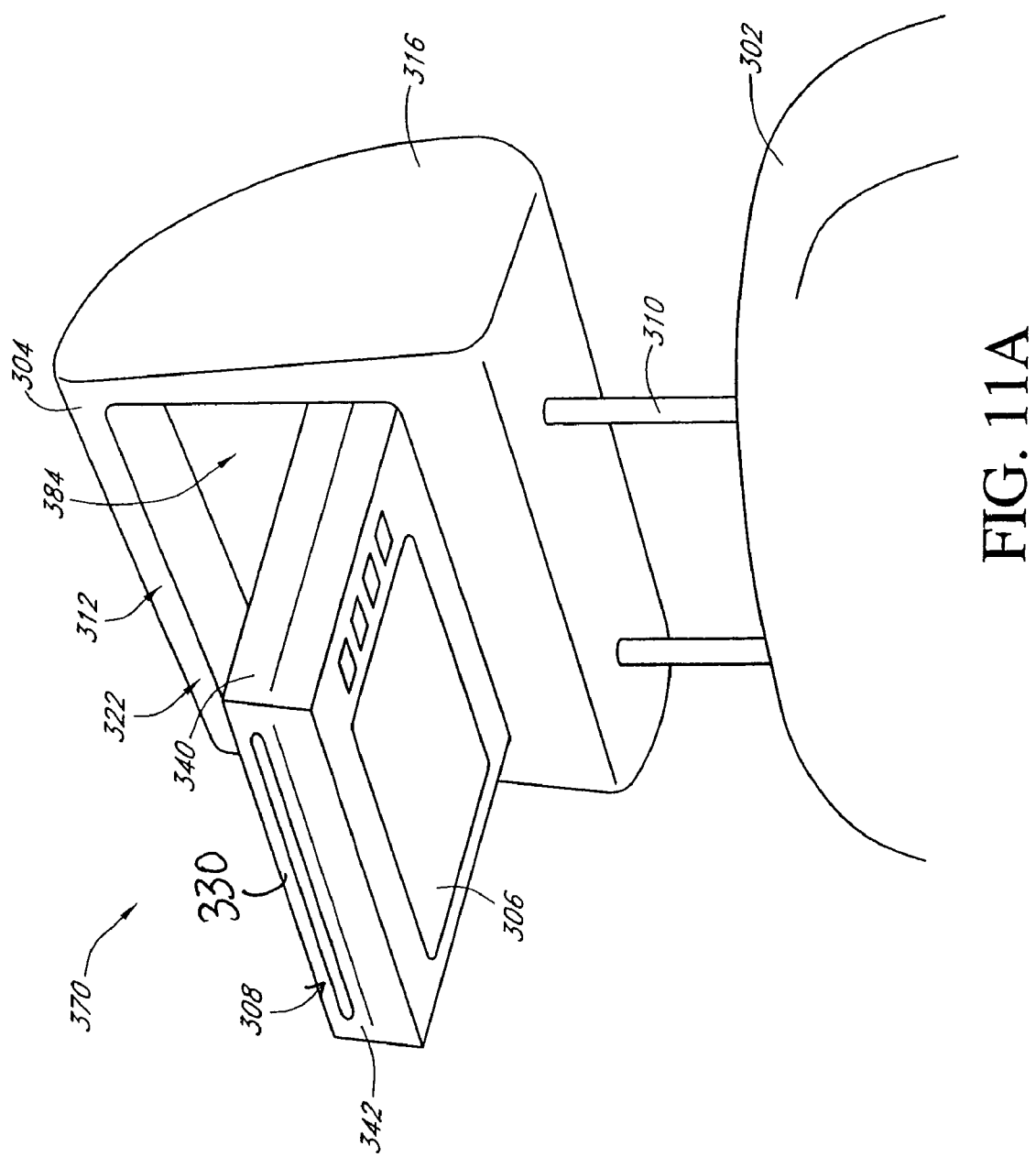
FIGS. 11A-11C illustrate still another embodiment of a video system for the vehicle seat having the head restraint with a pivotally attached video monitor and media player.
Figure 11B:
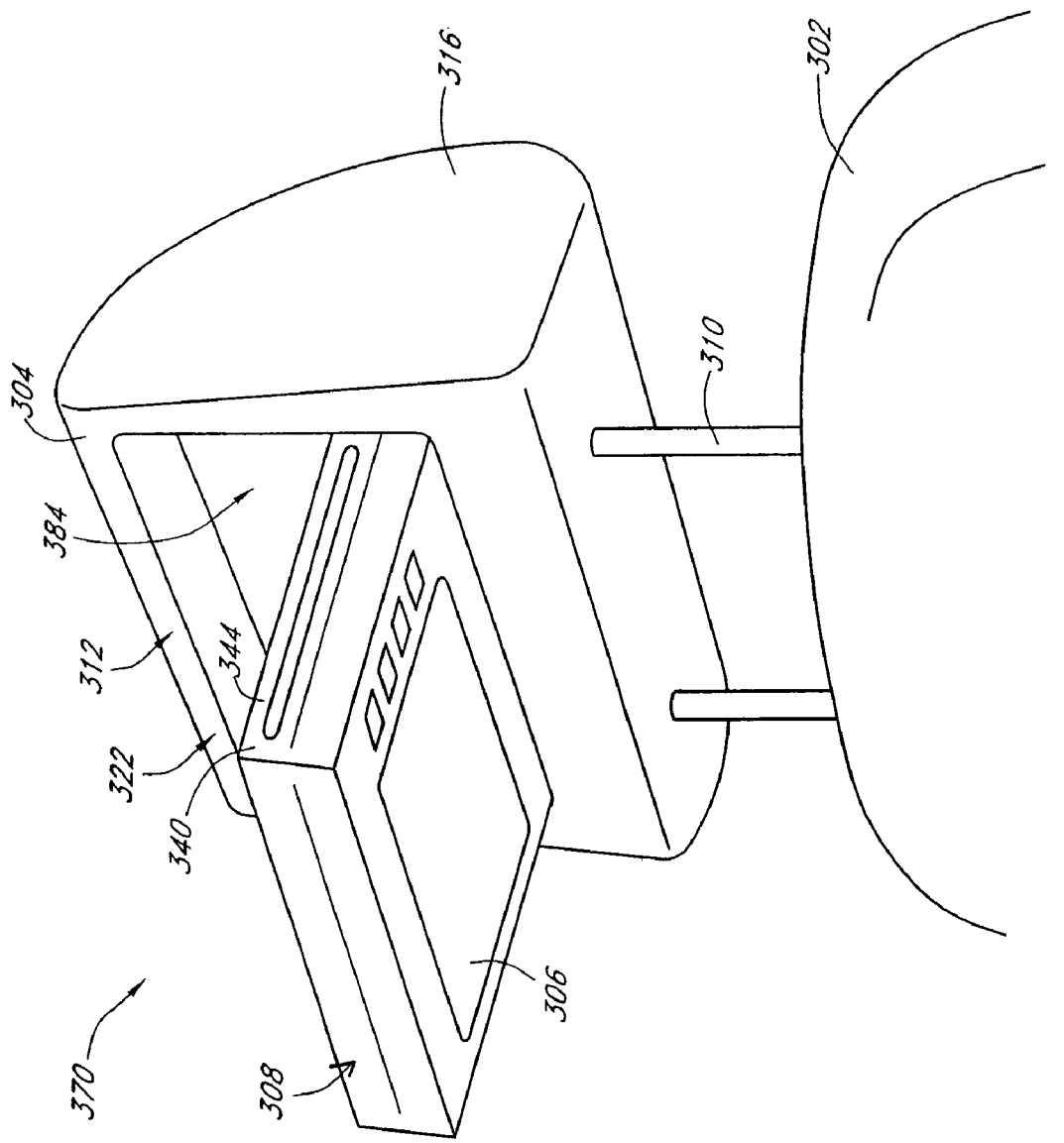
Figure 11C:
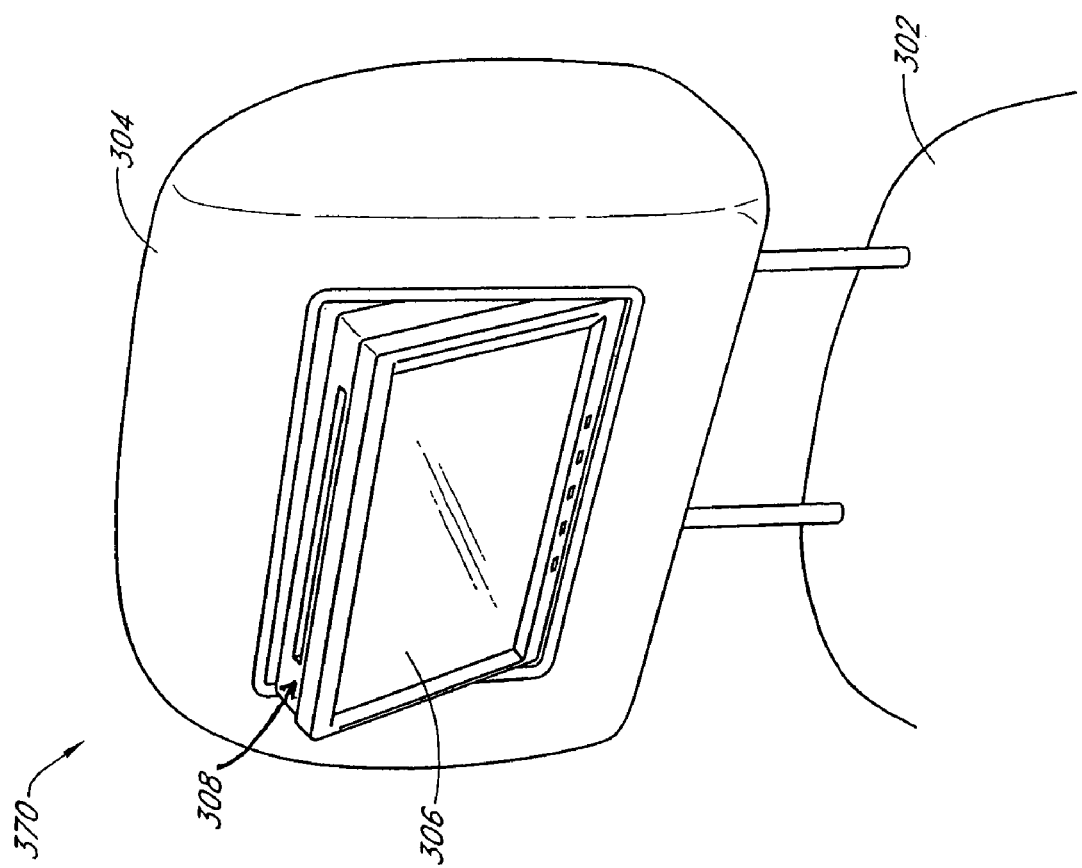
Figure 12A:
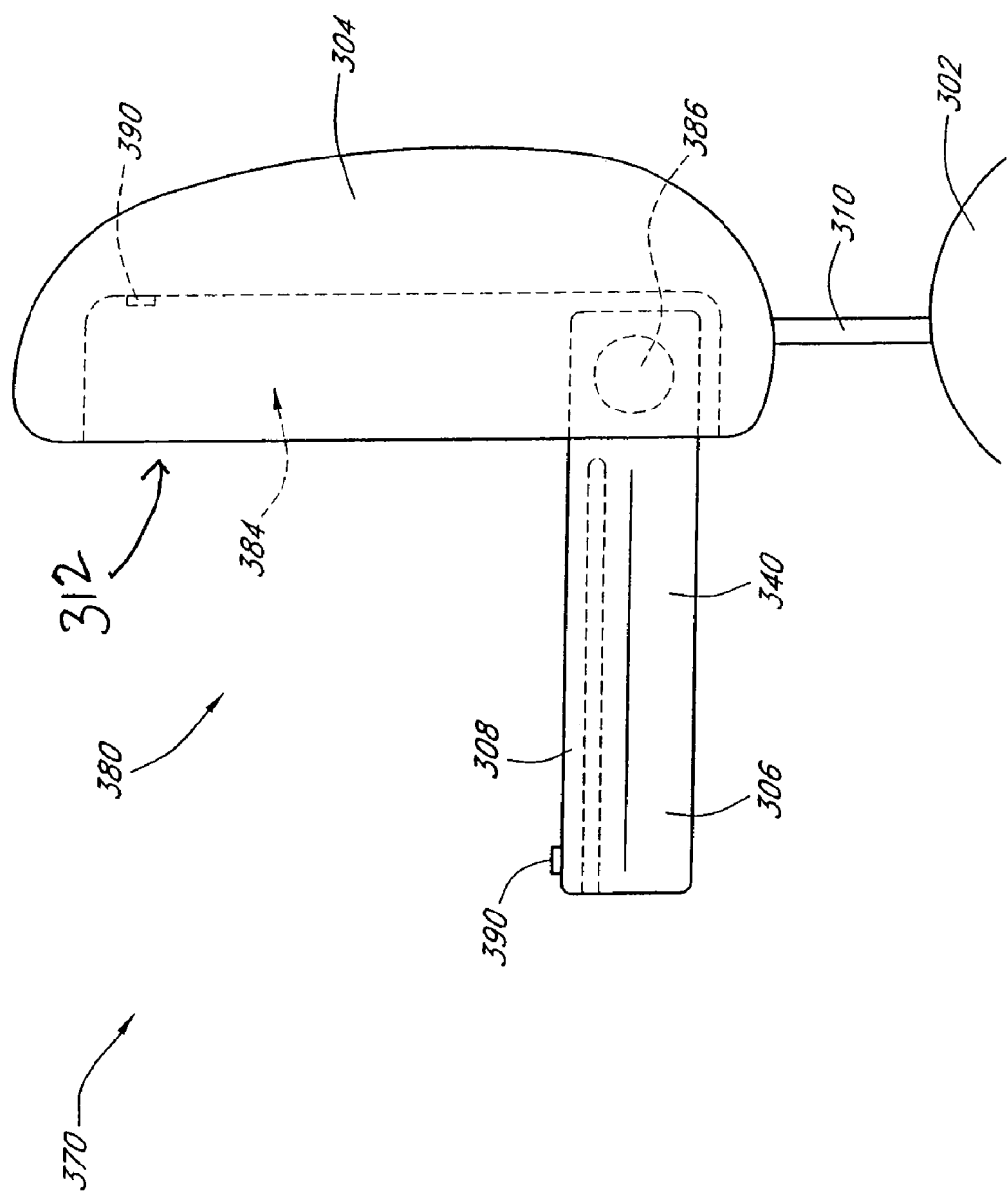
FIGS. 12A-12B illustrate side views of the video system of FIGS. 11A-11B.
Figure 12B:
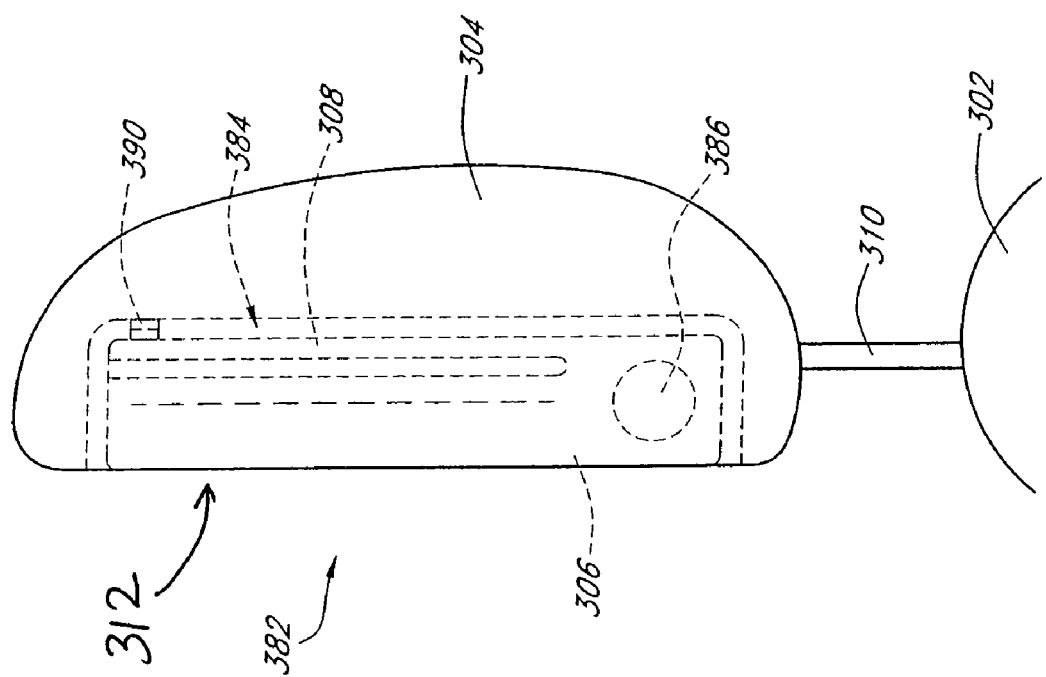

FIGS. 11A-11C illustrate still another embodiment of a video system 370 for the vehicle seat 302 having the head restraint 304 with the panel display 306 and media player 308 pivotally attached thereto. FIG. 12A illustrates a side view of the video system 370 illustrated in FIG. 11A in a deployed orientation 380. FIG. 12B illustrates a side view of the video system illustrated in FIG. 11A in a retracted orientation 382. As illustrated in FIGS. 11A-11B, the panel display 306 and media player 308 are mounted within a recess 384 formed in the rear section 312 of the head restraint 304 that is adapted to receive the panel display 306 and media player 308 for pivotal attachment therein.

In one embodiment, the panel display 306 and media player 308 are mounted within a housing 340 (FIG. 12A) so as to define the video system 370, which can be retracted and deployed from the recess 384 via a pivot member 386 (FIGS. 12A-12B). As illustrated in FIG. 1A, the planar front surface 330 of the media player 308 is accessible from a top portion 342 of the housing 340 by a user when the housing 340 or video system 370 is pivoted from the recess 384 in the deployed orientation 380 (FIG. 12A). In another embodiment, as illustrated in FIG. 1B, the media player 308 may be mounted within the housing 340 adjacent to the side portion 344 of the housing 340 so as to be accessible therefrom. In addition, it should be appreciated by those skilled in the art that the pivotally mounted video system 370 as illustrated in FIGS. 11A-12B may be mounted to the vehicle seat 362 of FIG. 9B without departing from the scope of the present teachings.

FIG. 11C illustrates the panel display 306 and media player 308 partially deployed or pivoted outward from the head restraint 304 of the vehicle seat 302. In one embodiment, the pivot member 386 (FIGS. 12A-12B) allows the panel display 306 and media player 308 to be deployed or pivoted a first distance from the recess 384 formed in the head restraint 304 so that storage media 440 (FIG. 13), such as a compact disc (CD) or digital video disc (DVD), can be received by the media player 308 for viewing thereof. It should be appreciated by those skilled in the art that the pivotal displacement of the panel display 306 and media player 308 from the recess 384 may vary in length without departing from the scope of the present teachings.

Advantageously, this allows a user to readily access the media player 308 for insertion and ejection of storage media into and out of the media player 308. In addition, the planar front surface 320 (FIG. 10) of the panel display 306 is viewable by a user when the video system 370 is pivoted within the recess 384 in the retracted orientation 382 (FIG. 12B). As illustrated in FIG. 12B, the retracted orientation 382 of the video system 370 allows a user to readily view images displayed on the panel display 306. Moreover, the panel display 306 and media player 308 function in a similar manner as previously described with reference to FIG. 9A.

As further illustrated in FIGS. 12A-12B, the pivot member 386 pivotally attaches the video system 370 to the inner sidewalls of the recess 384 formed in the rear section 312 of the head restraint 304. Advantageously, the pivot member 386 allows for the video system 370 to be pivoted outward from the recess 384 so that a user can readily access the media player 308, and, in addition, the pivot member 386 also allows for the video system 370 to be pivoted towards the recess 384 so as to engage the recess 384 in the retracted orientation 382 so that user can readily view the panel display 306. As further illustrated in FIGS. 12A-12B, the head restraint 304 may further comprise a means for engagement 390 that allows the video system 370 to be secured in the retracted orientation 382. In general, it should be appreciated that some possible means for achieving such an engagement include but are not limited to magnetic components, mechanical clips, velcro strips, and the like.

Figure 13:
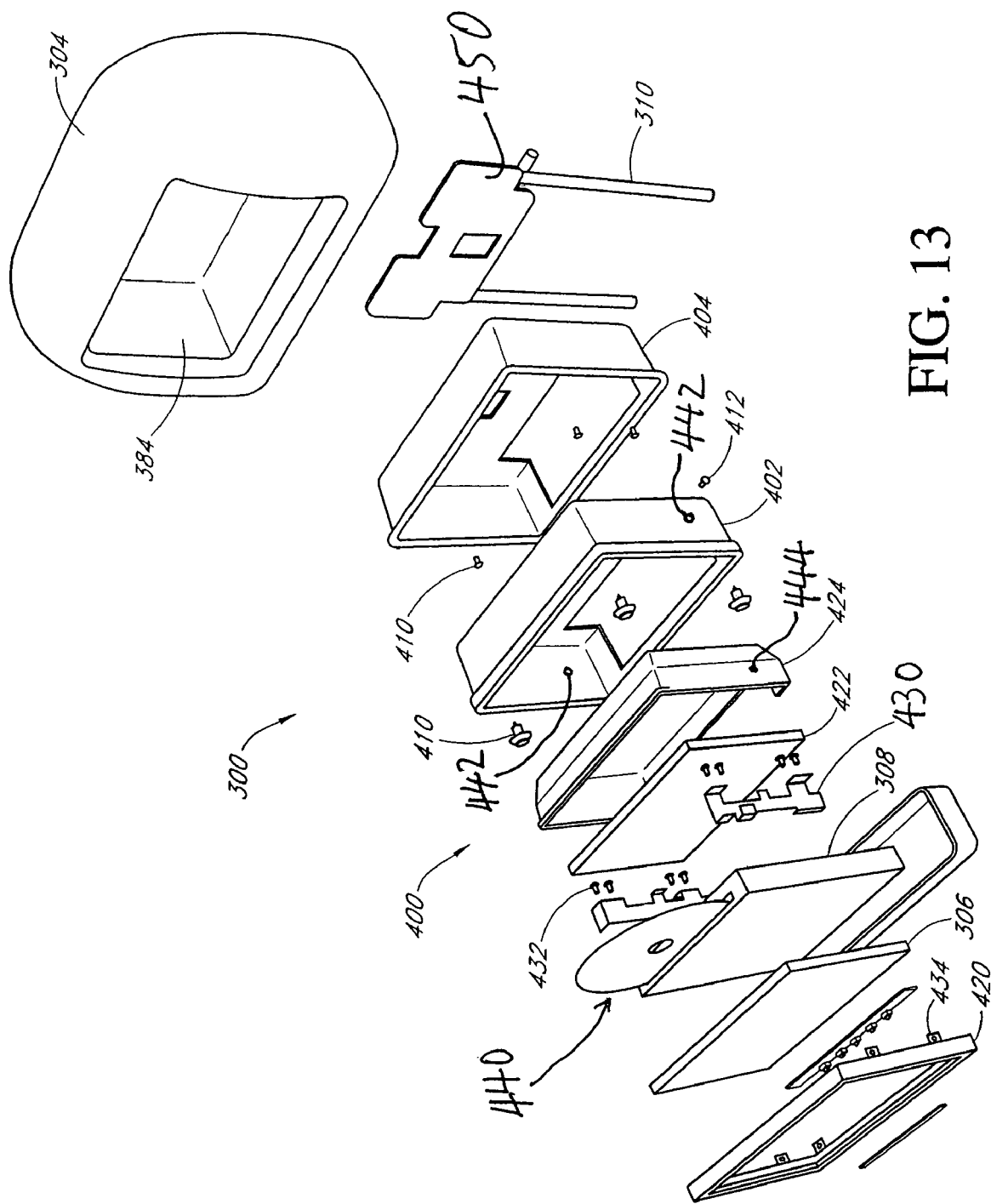
FIG. 13 illustrates an exploded view of the video system.

FIG. 13 shows an exploded view of one embodiment of a media system 300 mounted to a head restraint 304. In one embodiment, the head restraint 304 is an adjustable head restraint, and includes a support member 450 mounted to generally vertical posts 310. The head restraint may also be a generally fixed part of a seat such as a bucket seat. Thus, the concepts of mounting the media system to the head restraint also apply to the fixed seats.

As shown in FIG. 13, a receptacle 404 is shown to mount to the support member 450 by a first fasteners 410. The first fasteners 410 may include screws, clips, and other fastening means. Thus in the embodiment shown in FIG. 13, the receptacle 404 is mounted substantially within the head restraint 304 so as to be able to receive the media system 300 through an opening 384 defined by the head restraint 304 in a manner described below.

In one embodiment, the receptacle 404 may be incorporated into the head restraint 304 by having a bun material (such as foam) molded about the receptacle 404. Thus, although the receptacle 404 is shown to be mounted to the support member 450 in FIG. 13, it will be understood that the receptacle 404 can be mounted to the head restraint 304 by such molding process.

As further shown in FIG. 13, one embodiment of the media system 300 includes a housing that houses a media player 308 and a panel display 306 as a substantially single unit. Such a modular media system 300 can be mounted generally within the receptacle 404 quickly and efficiently.

In one embodiment, the housing includes a shell member 424 that allows mounting of the media player 440 and the panel display 306 such that the viewable portion of the panel display 306 generally faces towards a viewer. The media player 440 can be mounted to the shell member 424 in a number of ways, and the panel display 306 can be mounted adjacent the media player 440 in a number of ways. In one embodiment, the media player 440 can be mounted to a rear plate member 422 via mounting members 430 and second fasteners 432. The second fasteners may include screws, clips, and other fastening means. The rear plate member 422 can be mounted to the shell member 424 in a number of ways, including but not limited to fasteners such as screws, clips, retainer, and the like.

In one embodiment, the media system 300 also includes a front plate member 420 that generally frames the panel display 306. In one embodiment, the front plate member 420 includes tabs 434 that are adapted to mount to other parts of the housing thereby at least partially encapsulating the media player 308 and the panel display 306 as a modular unit.

In one embodiment, the shell member 424 that houses the media player 308 and the panel display 306 is coupled to a carrier member 402. The coupling between the shell member 424 and the carrier member 402 can be achieved in a number of ways. In one embodiment, the coupling may allow the shell member 424, and thus the media player 308 and the panel display 306, to pivot about a selected location on the carrier member 402. Thus in the embodiment shown in FIG. 13, the coupling includes pivot fasteners 412 (shown on one side) that extend through holes 442 defined by the carrier member 402, and fasten to holes 444 defined by the shell member 424. Thus, the pivot fasteners 412 allow the shell member, and thus the media player 308 and the panel display 306, to pivot about an axis defined by the pivot fasteners 412. Such a pivotable motion of the shell member 424 allows the viewer to adjust the viewing angle of the panel display 306.

In other embodiments, the shell member 424 can be coupled to the carrier member 402 to allow different pivoting motion(s). As an example, such coupling may allow the panel display to be pivoted in a side-to-side manner (by having pivot fasteners extend generally vertically). In another example, the coupling may include a ball and socket type swivel that allows the panel to be pivotally rotated about the carrier member in a number of ways. Such pivoting means are described above in reference to FIGS. 6A-C.

As further shown in FIG. 13, the carrier member 402 (with the shell member 444 mounted therein) mounts within the receptacle 404. The carrier member 402 may be mounted to the receptacle 404 in a number of ways. In one embodiment, a relatively quick mounting can be achieved by using fasteners 410 that are similar to the fasteners 170 described above in reference to FIG. 4. The carrier member 402 can also be mounted to the receptacle 404 by, for example, other forms of fasteners, clips, retainers, and the like.

Thus, one can see that in one embodiment, the carrier member 402 and various parts therein can be preassembled. The receptacle 404 can also be premounted to the head restraint 304. The mounting of the carrier member 402 can then be achieved by "snapping" the carrier member 402 within the receptacle 404, thereby simplifying the installation of the media player 308 and the panel display 306.

Such a mounted media system then allows a user to pivot the shell member 424 to allow insertion or removal of the storage media 440, such as a DVD, to or from the media player. The pivotable motion of the shell member 424 also allows the viewing angle of the panel display 306 to be adjusted.

One aspect of the present teachings relates to a head restraint having a media component mounted in a manner that allows dissipation of energy imparted on the media component when it is impacted by a moving object such as a head of an occupant. As an example, a rear passenger sitting behind a media component may experience a sudden deceleration during a frontal impact collision, and the passenger's head or other body part may impact the media component. A dissipation of such a collision energy can reduce the likelihood and/or severity of injury to that passenger.

FIGS. 14 to 17 now show an assembly having such an energy dissipating feature. As shown in a cutaway view of FIG. 14A, one embodiment of an energy dissipating head restraint assembly 500 is adapted for an adjustable head restraint 502. The energy dissipating assembly 500 includes one or more posts 506 that allow generally vertical adjustment of the head restraint 502, and a support member 504 mechanically coupled to the one or more posts 506, so as to provide structural integrity of the head restraint 502.

As further shown in FIG. 14A, a media component 510 is mounted at least partially within the head restraint 502. The media component 510 may be a panel display, a media player, an integrated system of media player and panel display, or any other devices disclosed herein. The media component 510 is shown to be mounted to the support member 504 by an energy dissipating coupling assembly 512 that is described below in greater detail.

FIG. 14B shows a cutaway view of one embodiment of a similar energy dissipating head restraint assembly 520 for a head restraint portion 522 of a fixed bucket-type seat. The energy dissipating assembly 520 includes a support member 524 that facilitates structural integrity of the head restraint 522. Although not shown, the support member 524 may be mechanically coupled to an internal seat frame.

As further shown in FIG. 14B, a media component 530 is mounted at least partially within the head restraint 522. The media component 530 is shown to be mounted to the support member 524 by an energy dissipating coupling assembly 532 that is described below in greater detail.

FIGS. 15A and B now show an example of how one embodiment of an energy dissipating coupling assembly 540 can work during an impact situation. For the purpose of description, a media component 542 is shown to be coupled to a support member 544 by the coupling assembly 540. It will be understood that the manner in which the coupling assembly 540 couples the media component 542 to the support member 544, and the manner in which such a coupling operates, are applicable to the adjustable or fixed head restraints, or any combinations or variations thereof.

FIG. 15A shows how the energy dissipating coupling 540 can couple the media component 542 to the support member 544. In one embodiment, the coupling 540 includes a panel 546 that is coupled to one or more energy dissipating members 550. The panel 546 is adapted to allow mounting of the media component 542 thereto. The energy dissipating member 550 can be adapted to facilitate mounting of the coupling 540 to the support member 544 or a structure associated with the support member 544, thereby providing the energy dissipation means between the media component 542 and the support member 544. It will be understood that the media component 542 may include various forms and types of devices, and various means of mounting such devices may be used.

The media component 542 can be mounted to the panel 546 in any number of ways, including but not limited to, screws, clips, retainers, adhesive, and the like. Also, the energy dissipating members 550 can be coupled to the support member 544 in any number of ways, including but not limited to, screws, clips, retainers, adhesive, and the like.

FIG. 15A shows the energy dissipating coupling 540 in a "non-deformed" configuration—that is, before being subjected to a significant impact. For the purpose of description, energy dissipation can be achieved by deformation of one or more energy dissipating couplings 540. It will be understood that the energy dissipation by deformation can be implemented in any number of ways. It will also be understood that energy can be dissipated in other modes where the deformed part(s) can be at least partially restored, such as in a damped spring type device.

FIG. 15B shows an object, such as a head 552 of an occupant, impacting a portion of the media component 542, thereby imparting a force 554 having a component directed generally towards the support member 544. Energy associated with such a force is shown to be dissipated by a deformation of one or more energy dissipating members 550. Such a deformation of the energy dissipating members 550 can reduce the likelihood and/or the severity of injury by the occupant caused to the impacting head 552.

Figure 16B:
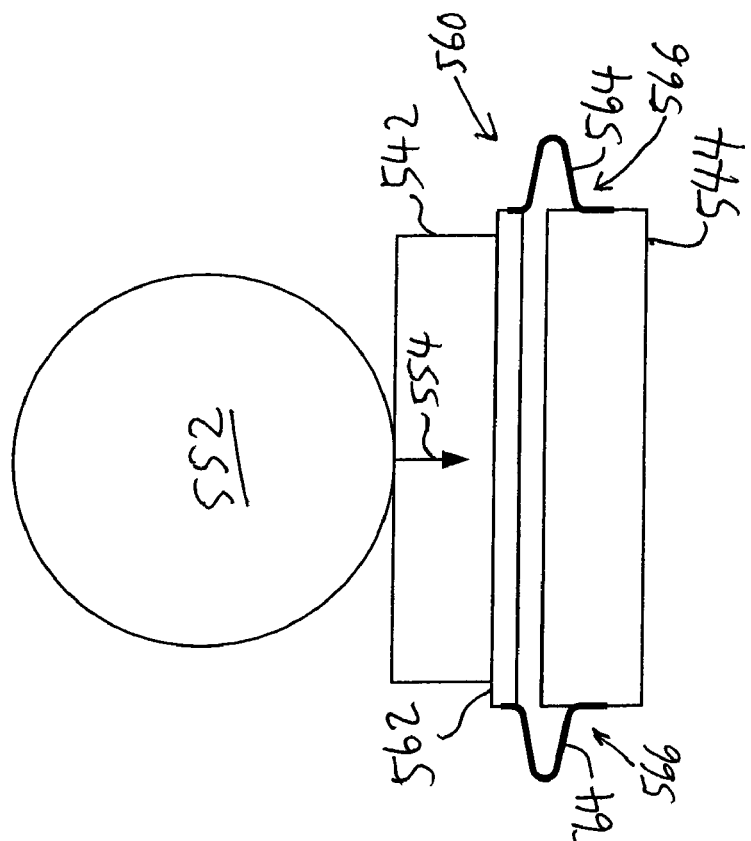
FIGS. 16A and B illustrate one embodiment of a energy dissipating coupling between the media component and a support member associated with the vehicle seat, where energy is dissipated by deformation of one or more deformable tabs associated with the coupling.
Figure 16A:
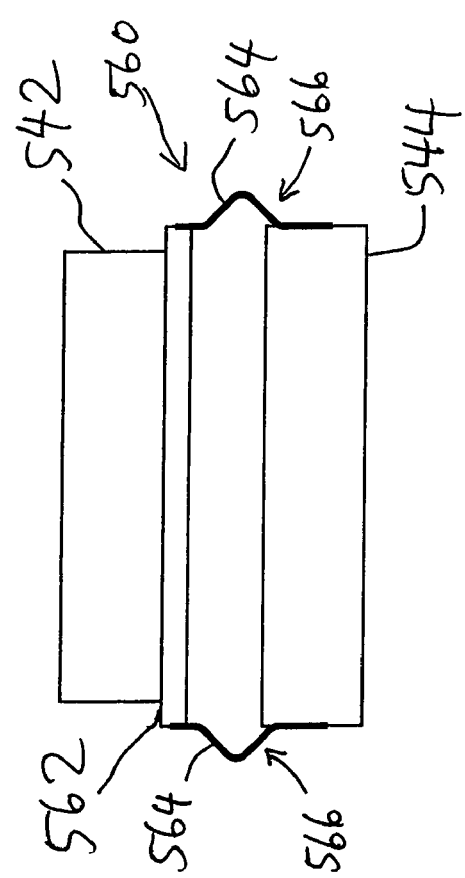
Figure 17A:
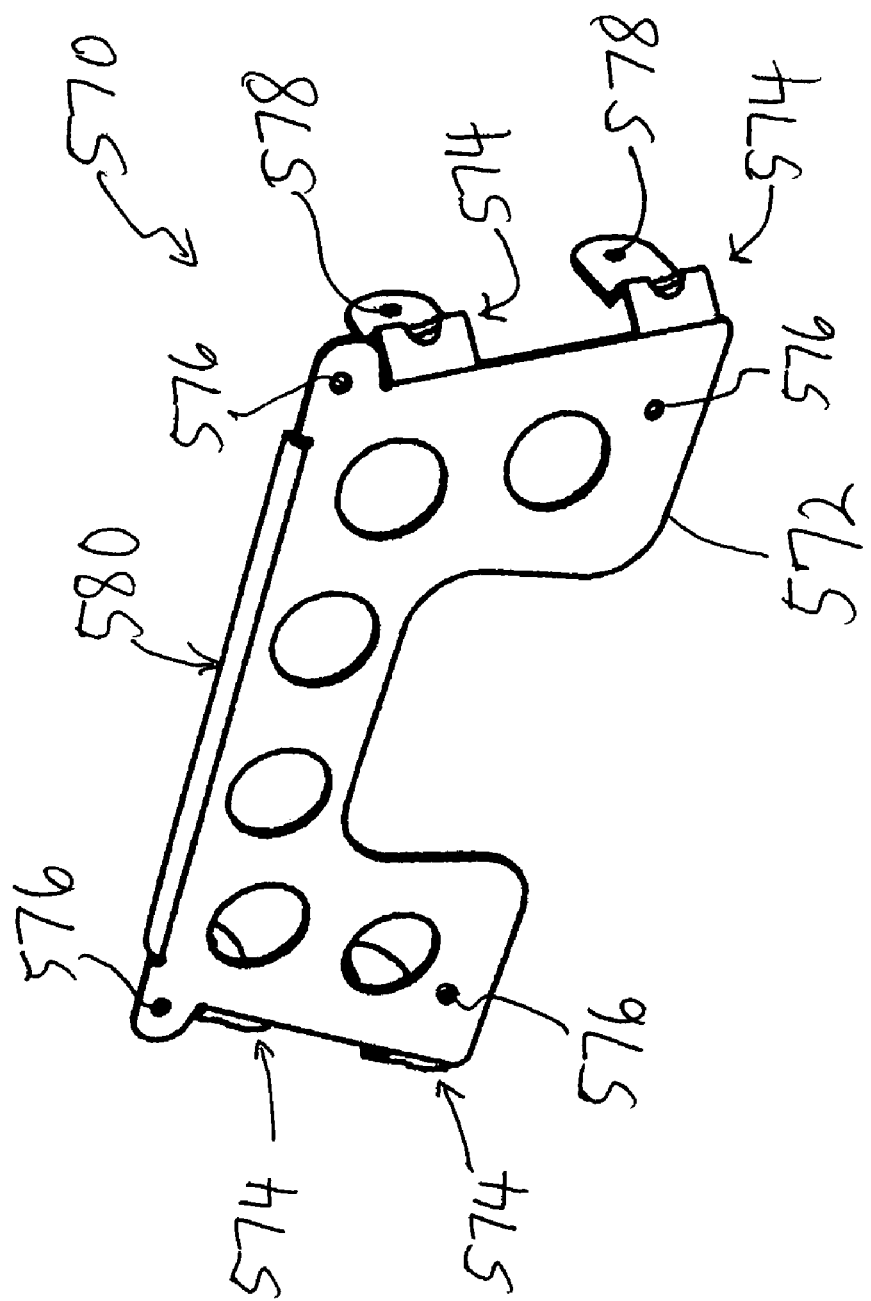
FIGS. 17A-D illustrate one embodiment of the energy dissipating coupling of FIGS. 16A and B.
Figure 17D:
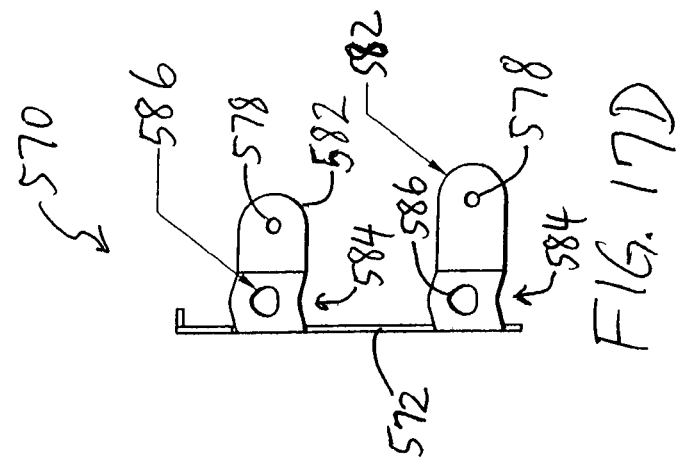
Figure 17B:
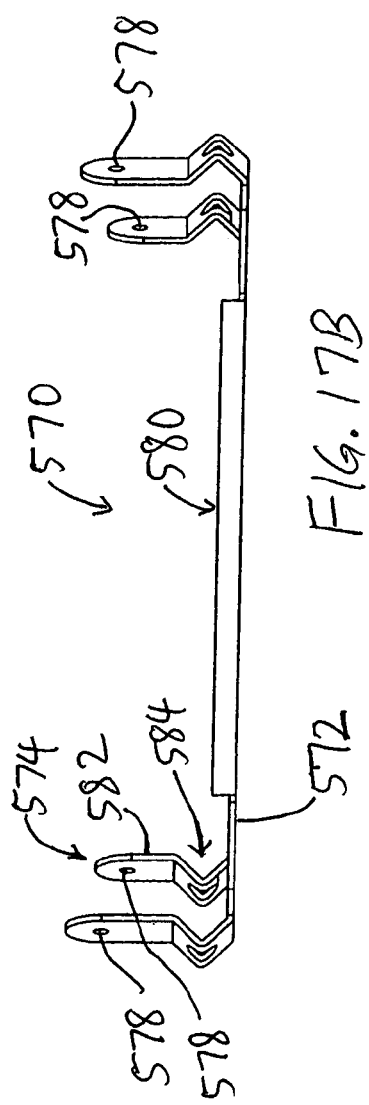
Figure 17C:
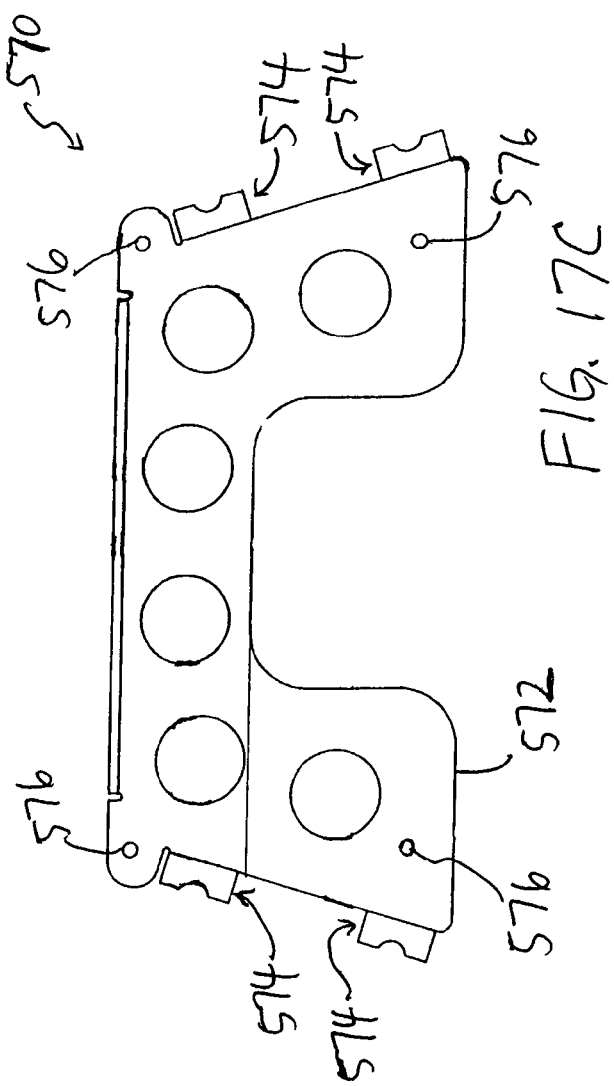

FIGS. 16A and B now show top views of one embodiment of an energy dissipating coupling 560 that can be used as the coupling described above in reference to FIGS. 15A and B. The coupling 560 includes a panel 562 that can be attached to the media component 542. The coupling 560 further includes one or more tabs 566, where one end of the tab 566 is attached to the panel 562 and the other end of the tab 566 can be attached to the support member 544 or a structure associated with the support member 544. The tab 566 defines a bend 564 that can deform when subjected to a force generally between the two ends of the tab 566.

FIG. 16B shows an impact situation (where the head 552 impacts the media component 542) that causes such a deforming force (554 in FIGS. 15B and 16B). The bends 564 of the tabs 566 are shown to be deformed by at least a portion of the energy associated with the impact force 554.

FIGS. 17A-D now show an example energy dissipating coupling 570 having a plurality of deformable tabs 574. The coupling 570 includes a panel 572 that defines a plurality of mounting holes 576 that facilitate mounting of a media component (not shown). The panel 572 may include a lip 580 along an edge for improved rigidity of the panel 572.

In one embodiment, the plurality of tabs 574 are formed as extensions from the panel 572, such that a distal end 582 of each tab 574 defines a mounting hole 578 that facilitates mounting of the coupling 570 to a support member (not shown). Each tab 574 defines a deformable bend 584 between the distal end 582 and the panel 572 so as to allow energy dissipation by deformation. In one embodiment, the bend 584 defines an aperture 586, where the size of the aperture 586 can be adjusted to adjust the manner in which the bend 584 deforms.

The deformation of the bend 584 depends on factors that include magnitude of the impact force, and the mechanical property of the bend 584. In one embodiment, the coupling 570 is formed from a single piece of an 18-gauge steel. For a given gauge of material (such as the 18 gauge steel), the deformation property of the bend 584 can be adjusted by adjusting the size of the aperture 586 on the bend 584.

Although the foregoing description has shown, described and pointed out the fundamental novel features of the invention, it will be understood that various omissions, substitutions, and changes in the form of the detail of the apparatus as illustrated, as well as the uses thereof, may be made by those skilled in the art, without departing from the spirit or scope of the present invention. Consequently, the scope of the invention should not be limited to the foregoing discussion, but should be defined by the appended claims.

What is claimed is:

1. A media assembly adapted to be installed into a seat back of a vehicle, the assembly comprising:
    a mounting structure that is coupled to the seat back of the vehicle wherein the seat back defines a first outer surface visible to a viewer sitting in a back seat of the vehicle;
    a display that displays media to a viewer sitting within the vehicle;
    a media player having an input opening into which a user can position a media storage device wherein the media player provides signals to the display to thereby induce the display to visually display the contents of the media storage device;
    a housing defining a recess having a first opening that receives both the display and the media player such that the display is positioned proximate the first opening of the recess with the media player positioned inward in the recess from the first opening such that the media player does not impede visual access to the display wherein the housing is structured to permit selective access to the input opening of the media player to permit user positioning of the media storage device within the player and wherein the housing is adapted to be coupled to the mounting structure within the seat back of the vehicle to thereby retain the housing within the seat back such that the display is positioned adjacent the outer surface of the seat back;
    wherein the housing defines a second opening and the media player is positioned within the recess such that the input opening of the media player is accessible through the second opening of the housing.

2. The assembly of claim 1, wherein the housing is pivotally mounted with respect to the mounting structure such that the display screen can be adjusted for improved visibility to the viewer.

3. The assembly of claim 2, wherein the housing comprises a ball and the mounting structure comprises a socket such that the ball is positioned within the socket to permit adjustment of the housing with respect to the mounting structure in two separate directions.

4. A media assembly adapted to be installed into a seat back of a vehicle the assembly comprising:
    a mounting structure that is coupled to the seat back of the vehicle wherein the seat back defines a first outer surface visible to a viewer sitting in a back seat of the vehicle;
    a display that displays media to a viewer sitting within the vehicle;
    a media player having an input opening into which a user can position a media storage device wherein the media player provides signals to the display to thereby induce the display to visually display the contents of the media storage device;
    a housing defining a recess having a first opening that receives both the display and the media player such that the display is positioned proximate the first opening of the recess with the media player positioned inward in the recess from the first opening such that the media player does not impede visual access to the display wherein the housing is structured to permit selective access to the input opening of the media player to permit user positioning of the media storage device within the player and wherein the housing is adapted to be coupled to the mounting structure within the seat back of the vehicle to thereby retain the housing within the seat back such that the display is positioned adjacent the outer surface of the seat back;
    wherein the housing is pivotally attached to the mounting structure so as to be rotatable between a recessed position wherein the display is positioned substantially flush with the first outer surface of the seat and the input opening of the media player is hidden from view within the seat and an extended position wherein the input opening of the media player is exposed from the seat so as to be accessible to the viewer.

5. The assembly of claim 4, wherein the mounting structure comprises a retainer that defines a recess having two opposed side walls positioned within the seat and wherein the housing is pivotally attached to the retainer at the two opposed side walls to facilitate movement between the recessed position and the extended position.

6. The assembly of claim 5, wherein the retainer defines two opposed side walls and an opposed upper and lower wall and wherein the housing is pivotally attached to the two opposed side walls adjacent the lower wall of the retainer such that the input opening of the media player is positioned proximate the upper wall of the retainer when the housing is in the recessed position.

7. An electronic assembly mounted to a head restraint of a vehicle seat, comprising:
   a media player that retrieves information stored on a media storage device, processes the information, and outputs a signal corresponding to the information;
   a panel display device that receives the signal from the media player and displays a visual representation of the signal, wherein the signal includes an audio component;
   a housing assembly that houses the media player and the panel display device as a substantially single unit, wherein the housing assembly facilitates mounting of the substantially single unit to the head restraint;
   a shell member that allows mounting of the media player and the panel display thereto; and
   a carrier member dimensioned to receive the shell member therein such that the carrier member can be preassembled with the shell member having the media player and the panel display mounted thereto;
   wherein the shell member is pivotally mounted to the carrier member so as to allow the shell member to pivot with respect to the carrier member; and
   wherein the pivoting of the shell member allows pivoting of the media player for insertion or removal of a media storage device to or from the media player.

8. The assembly of claim 7, wherein the media player comprises a digital video disc player that plays a digital video disc.

9. The assembly of claim 7, wherein the media player includes a hard disc storage and plays digital information stored thereon.

10. The assembly of claim 7, wherein the media player reads and plays digital information stored on a memory chip.

11. The assembly of claim 7, wherein the panel display device comprises a flat panel display.

12. The assembly of claim 7, wherein the panel display device comprises a flexible panel display.

13. The assembly of claim 7, wherein the pivoting of the shell member allows adjust of viewing angle of the panel display.

14. The assembly of claim 7, further comprising an external interface that allows interfacing of the electronic assembly with an external electronic component.

15. The assembly of claim 14, wherein the external interface comprises a jack that allows connection with the external electronic component so as to allow the external electronic component to send an external signal to be displayed on the panel display device.

* * * * *

UNITED STATES PATENT AND TRADEMARK OFFICE
CERTIFICATE OF CORRECTION

| | |
|---|---|
| PATENT NO. | : 7,597,393 B1 |
| APPLICATION NO. | : 10/819341 |
| DATED | : October 6, 2009 |
| INVENTOR(S) | : Tuccinardi et al. |

It is certified that error appears in the above-identified patent and that said Letters Patent is hereby corrected as shown below:

Title page, item 76 (inventors), please delete "912," for Roel C. Espina and insert therefore, --902,--.

At column 9, line 40, please delete "Video" and insert therefore, --video--.

At column 13, line 38, please delete "1A," and insert therefore, --11A,--.

At column 13, line 43, please delete "1B," and insert therefore, --11B,--.

At column 18, line 34, please delete "vehicle" and insert therefore, --vehicle,--.

At column 19, line 28, please delete "therein" and insert therefore, --therein,--.

At column 20, line 20, please delete "adjust of" and insert therefore, --adjustment of a--.

Signed and Sealed this

Eighth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,597,393 B1 Page 1 of 1
APPLICATION NO. : 10/819341
DATED : October 6, 2009
INVENTOR(S) : Tuccinardi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1155 days.

Signed and Sealed this

Twenty-eighth Day of September, 2010

David J. Kappos
*Director of the United States Patent and Trademark Office*